(12) United States Patent
Tian et al.

(10) Patent No.: US 10,885,344 B2
(45) Date of Patent: Jan. 5, 2021

(54) METHOD AND APPARATUS FOR GENERATING VIDEO

(71) Applicants: Baidu USA LLC, Sunnyvale, CA (US); Baidu.com Times Technology (Beijing) Co., Ltd., Beijing (CN)

(72) Inventors: Hao Tian, Sunnyvale, CA (US); Darning Lu, Sunnyvale, CA (US); Xi Chen, Sunnyvale, CA (US); Jeff ChienYu Wang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/703,716

(22) Filed: Dec. 4, 2019

(65) Prior Publication Data
US 2020/0320307 A1    Oct. 8, 2020

(30) Foreign Application Priority Data

Apr. 8, 2019    (CN) .......................... 2019 1 0277167

(51) Int. Cl.
| | |
|---|---|
| *H04N 9/80* | (2006.01) |
| *G06K 9/00* | (2006.01) |
| *G10L 13/08* | (2013.01) |
| *G10L 13/00* | (2006.01) |
| *H04N 5/93* | (2006.01) |

(52) U.S. Cl.
CPC ..... *G06K 9/00731* (2013.01); *G06K 9/00751* (2013.01); *G06K 9/00765* (2013.01); *G10L 13/00* (2013.01); *G10L 13/08* (2013.01); *G06K 2009/00738* (2013.01)

(58) Field of Classification Search
CPC .......... G06K 9/00731; G06K 9/00744; G06K 9/6256; G06F 40/30; G06F 40/169
USPC ................................ 386/241, 281, 248, 249
See application file for complete search history.

(56) References Cited

U.S. PATENT DOCUMENTS

2020/0275147 A1* 8/2020 Pizzurro .......... H04N 21/23424

FOREIGN PATENT DOCUMENTS

CN    108012192    *  5/2018

* cited by examiner

*Primary Examiner* — Robert Chevalier
(74) *Attorney, Agent, or Firm* — Seed IP Law Group LLP

(57) ABSTRACT

Embodiments of the present disclosure provide a method and apparatus for generating a video. The method may include: determining a commentary of a target news cluster, each piece of news in the target news cluster being specific to a given news event; generating a voice corresponding to each paragraph in the commentary using a speech synthesis technology; determining a candidate material resource set corresponding to the commentary based on a video and an image included in the target news cluster, the candidate material resource being a video or image; determining a candidate material resource sequence corresponding to the each paragraph in the commentary; and generating a video corresponding to the commentary based on the voice corresponding to the each paragraph in the commentary and the candidate material resource sequence.

24 Claims, 11 Drawing Sheets

METHOD AND APPARATUS FOR GENERATING VIDEO

CROSS-REFERENCE TO RELATED APPLICATIONS

This application claims priority to Chinese Patent Application No. 201910277167.5, filed on Apr. 8, 2019, titled "Method and apparatus for generating video," which is hereby incorporated by reference in its entirety.

TECHNICAL FIELD

Embodiments of the present disclosure relate to the field of computer technology, and specifically to a method and apparatus for generating a video.

BACKGROUND

With the development of network technology, all kinds of news from around the world may be issued to users via various media. For a given news event, various media (such as a news website or a news app) will edit different news, and focuses of news issued by different media will have certain differences, but various news reporting the given news event will also have more or less overlap information.

A user may extract desired information only after reading a plurality of news reports, thereby resulting in a low efficiency in acquiring news by the user. To help the user to improve the efficiency in acquiring news, a plurality of pieces of news of the given news event may be aggregated, redundant information in the plurality of pieces of news may be removed, and a commentary specific to the news event may be extracted.

SUMMARY

Embodiments of the present disclosure provide a method and apparatus for generating a video.

In a first aspect, an embodiment of the present disclosure provides a method for generating a video, including: determining a commentary of a target news cluster, each piece of news in the target news cluster being specific to a given news event; generating a voice corresponding to each paragraph in the commentary using a speech synthesis technology; determining a candidate material resource set corresponding to the commentary based on a video and an image included in the target news cluster, the candidate material resource being a video or image; determining a candidate material resource sequence corresponding to the each paragraph in the commentary; and generating a video corresponding to the commentary based on the voice corresponding to the each paragraph in the commentary and the candidate material resource sequence.

In a second aspect, an embodiment of the present disclosure provides an apparatus for generating a video, including: a commentary determining unit configured to determine a commentary of a target news cluster, each piece of news in the target news cluster being specific to a given news event; a voice generating unit configured to generate a voice corresponding to each paragraph in the commentary using a speech synthesis technology; a material resource set determining unit configured to determine a candidate material resource set corresponding to the commentary based on a video and an image included in the target news cluster, the candidate material resource being a video or image; a material resource sequence determining unit configured to determine a candidate material resource sequence corresponding to the each paragraph in the commentary; and a video generating unit configured to generate a video corresponding to the commentary based on the voice corresponding to the each paragraph in the commentary and the candidate material resource sequence.

In a third aspect, an embodiment of the present disclosure provides a server, including: one or more processors; and a storage apparatus, storing one or more programs thereon, where the one or more programs, when executed by the one or more processors, cause the one or more processors to implement the method according to any implementation in the first aspect.

In a fourth aspect, an embodiment of the present disclosure provides a computer readable storage medium, storing a computer program thereon, where the computer program, when executed by one or more processors, implements the method according to any implementation in the first aspect.

In a fifth aspect, an embodiment of the present disclosure provides another server, including an interface, a storage storing one or more programs, and one or more processors operatively connected to the interface and the storage and configured to: determine a commentary of a target news cluster, each piece of news in the target news cluster being specific to a given news event; generate a voice corresponding to each paragraph in the commentary using a speech synthesis technology; determine a candidate material resource set corresponding to the commentary based on a video and an image included in the target news cluster, the candidate material resource being a video or image; determine a candidate material resource sequence corresponding to the each paragraph in the commentary; and generate a video corresponding to the commentary based on the voice corresponding to the each paragraph in the commentary and the candidate material resource sequence.

In a sixth aspect, an embodiment of the present disclosure provides a computer readable storage medium, storing a computer program thereon, where the computer program, when executed by one or more processors, causes the one or more processors to: determine a commentary of a target news cluster, each piece of news in the target news cluster being specific to a given news event; generate a voice corresponding to each paragraph in the commentary using a speech synthesis technology; determine a candidate material resource set corresponding to the commentary based on a video and an image included in the target news cluster, the candidate material resource being a video or image; determine a candidate material resource sequence corresponding to the each paragraph in the commentary; and generate a video corresponding to the commentary based on the voice corresponding to the each paragraph in the commentary and the candidate material resource sequence.

To improve the user's efficiency in acquiring news, the existing technologies will often generate a commentary for a news cluster, the user needs to read the commentary in a literal form to acquire a news digest, and no corresponding video is generated for the commentary. The method and apparatus for generating a video according to embodiments of the present disclosure first determine a commentary of a target news cluster, each piece of news in the target news cluster being specific to a given news event; then generate a voice corresponding to each paragraph in the commentary using a speech synthesis technology; then determine a candidate material resource set corresponding to the commentary based on a video and an image included in the target news cluster, the candidate material resource being a video or image; then determine a candidate material resource sequence corresponding to each paragraph in the commentary; and finally generate a video corresponding to the commentary based on the voice corresponding to each paragraph in the commentary and the candidate material resource sequence, thereby achieving generating the commentary and the video corresponding to the commentary for the target news cluster.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It will be appreciated that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure maybe combined with each other on a non-conflict basis. The present disclosure will be described below in detail with reference to the accompanying drawings and in combination with embodiments.

Figure 1:
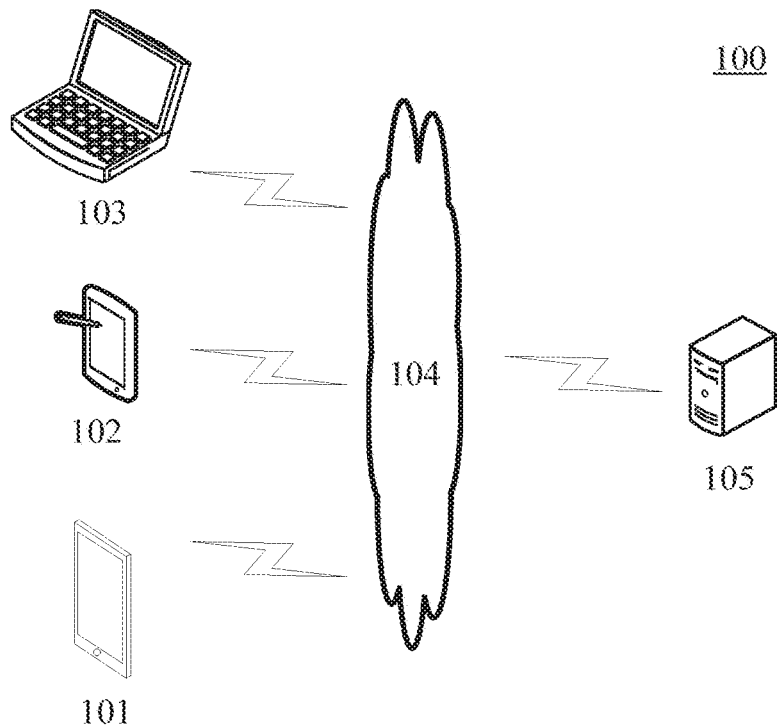
FIG. 1 is a diagram of an example system architecture in which some embodiments of the present disclosure may be implemented.

FIG. 1 shows an example system architecture 100 in which a method for generating a video or an apparatus for generating a video of some embodiments of present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, for example, to receive or send a message. The terminal devices 101, 102, and 103 may be provided with various communication client applications, such as a web browser application, a shopping application, a search application, an instant messaging tool, an email client, and social platform software.

The terminal devices 101, 102, and 103 may be hardware or software. When the terminal devices 101, 102 and 103 are hardware, the terminal devices may be various electronic devices having a display screen, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, and so on. When the terminal devices 101, 102, and 103 are software, the terminal devices may be installed in the above-listed electronic devices, or be implemented as a plurality of software programs or software modules, or be implemented as a single software program or software module. This is not specifically limited here.

The server 105 may be a server providing various services, such as a back-end website server providing support for a news website displayed on the terminal devices 101, 102, and 103. The back-end website server may process, e.g., analyze, data such as a received news page request, and return the processing result (e.g., page data of news webpages) to the terminal devices.

It should be noted that the method for generating a video according to some embodiments of the present disclosure is generally executed by the server 105. Accordingly, the apparatus for generating a video is generally provided in the server 105.

It should be noted that the server 105 may be hardware or software. When the server 105 is hardware, the server may be implemented as a distributed server cluster composed of a plurality of servers, or be implemented as a single server. When the server 105 is software, the server may be implemented as a plurality of software programs or software modules (e.g., software programs or software modules for providing page services of news webpages), or be implemented as a single software program or software module. This is not specifically limited here.

It should be understood that the numbers of terminal devices, networks, and servers in FIG. 1 are merely illustrative. Any number of terminal devices, networks, and servers may be provided based on actual requirements.

Figure 2A:
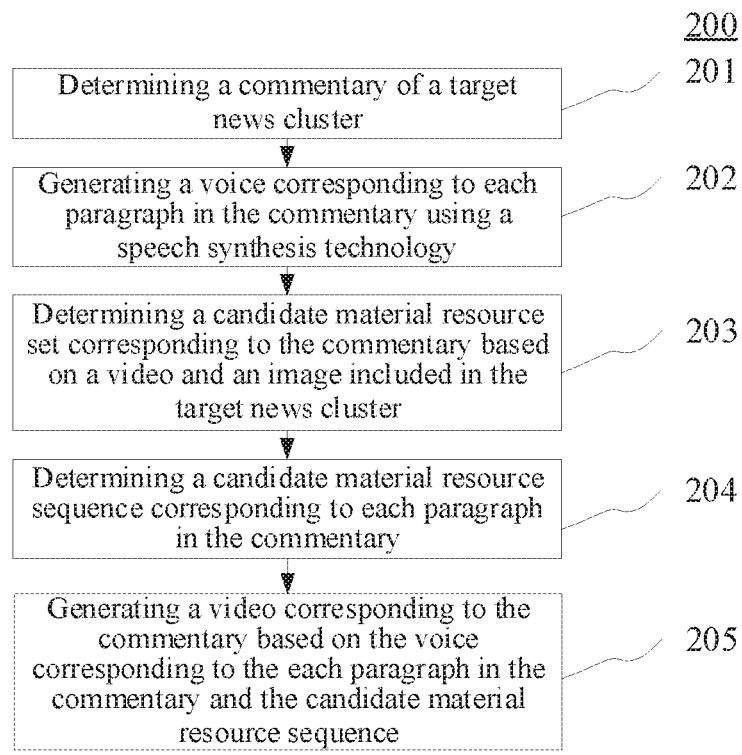
FIG. 2A is a flowchart of a method for generating a video according to an embodiment of the present disclosure.

Further referring to FIG. 2A, a process 200 of a method for generating a video according to an embodiment of the present disclosure is shown. The method for generating a video includes the following steps.

Step 201: determining a commentary of a target news cluster.

In the present embodiment, an executing body (e.g., the server shown in FIG. 1) of the method for generating a video may first acquire the target news cluster locally or remotely from an electronic device connected to the executing body via a network. Here, the target news cluster is composed of at least one piece of news specific to a given news event.

Here, the news event refers to an event taking place within a recent third preset duration (e.g., within three months).

Here, the news may be electronic data specific to the news event in various forms, and the news may be marked with corresponding generation time accordingly. The news may include at least one of the following items: a text, an image, an audio, or a video. For example, the news may be a webpage, or various documents. The document may include at least one of the following items: a text, an image, an audio, or a video. The news may alternatively be merely a text, an image, or a video.

In practice, the acquired news may be marked with a corresponding news event. Thus, the executing body may first acquire news generated within a recent first preset duration (e.g., within one day), and then form different news clusters including acquired at least one piece of news based on corresponding different news events.

It will be appreciated that, when the acquired news is not marked with the corresponding news event, the executing body may first acquire the news generated within the recent first preset duration (e.g., within one day), then cluster the acquired news by various implementations, form a news cluster including news clustered into a given category, news of different clusters belonging to different news clusters, and then obtain at least one news cluster. For example, in practice, news will generally have a news headline. The executing body may cluster a news headline of each piece of acquired news, and use a cluster of news headlines as a cluster of news corresponding to the news headlines.

Then, the executing body (e.g., the server shown in FIG. 1) may determine the commentary of the target news cluster by various implementations. The commentary may include at least one paragraph.

Figure 2B:
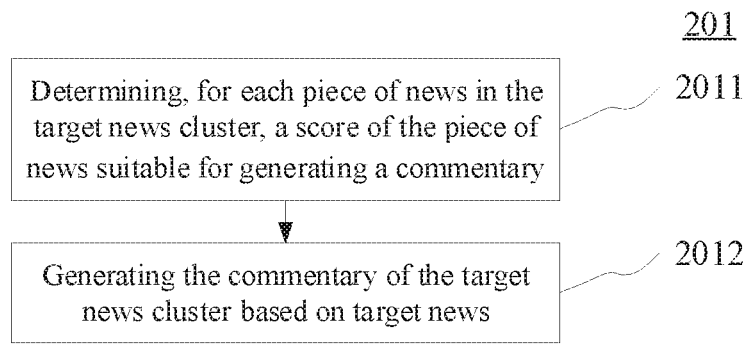
FIG. 2B is a resolved flowchart of step 201 according to an embodiment of the present disclosure.

In some alternative implementations of the present embodiment, step 201 may include step 2011 to step 2012 shown in FIG. 2B. Referring to FIG. 2B, a resolved flowchart of step 201 according to an embodiment of the present disclosure is shown.

Step 2011: determining, for each piece of news in the target news cluster, a score of the piece of news suitable for generating a commentary.

Here, the executing body may determine, for each piece of news in the target news cluster, the score of the piece of news suitable for generating the commentary by various implementations.

In some implementations, step 2011 may be performed as follows.

First, an eigenvalue of the news is extracted based on at least one feature.

For example, the at least one feature may include, but is not limited to, the following features: a word count of words included in the news, a term count of different terms included in the news, the number of images included in the news, the number of videos included in the news, the number of times of the news being read, the number of times of the news being forwarded, a sum of the word count of words included in each piece of news in the target news cluster, a sum of the term count of different terms included in each piece of news in the target news cluster, a sum of the number of images included in each piece of news in the target news cluster, a sum of the number of videos included in each piece of news in the target news cluster, a sum of the number of times of each piece of news being read in the target news cluster, and a sum of the number of times of each piece of news being forwarded in the target news cluster.

Then, a score of the news suitable for generating the commentary is determined based on the extracted at least one eigenvalue.

Here, the score of the news suitable for generating the commentary may be determined based on the extracted at least one eigenvalue by various implementations.

For example, weighted summation of the extracted at least one eigenvalue may be performed based on a preset weight of each feature, and the weighted summation result may be determined for use as the score of the news suitable for generating the commentary.

For another example, the following ratios may further be first determined:

(1) a ratio of the word count of words included in the news to the sum of the word count of words included in each piece of news in the target news cluster;

(2) a ratio of the term count of different terms included in the news to the sum of the term count of different terms included in each piece of news in the target news cluster;

(3) a ratio of the number of images included in the news to the sum of the number of images included in each piece of news in the target news cluster;

(4) a ratio of the number of videos included in the news to the sum of the number of videos included in each piece of news in the target news cluster;

(5) a ratio of the number of times of the news being read to the sum of the number of times of each piece of news being read in the target news cluster; and (6) a ratio of the number of times of the news being forwarded to the sum of the number of times of each piece of news being forwarded in the target news cluster.

Then, weighted summation of the determined each ratio may be performed based on a weight predetermined for the each ratio, and the weighted summation result may be determined for use as the score of the news suitable for generating the commentary.

In some implementations, step 2011 may be further performed as follows: inputting a text included in the news into a pre-trained score computing model, to obtain the score of the news suitable for generating the commentary.

Here, the score computing model is used for characterizing a corresponding relationship between the text and the score of the text suitable for generating the commentary.

As an example, the score computing model may be a corresponding relationship table that is pre-established by skilled persons based on statistics of a large number of eigenvectors obtained by feature extraction on a text and annotation results of scores of the text suitable for generating commentaries and stores a plurality of corresponding relationships between eigenvectors and scores suitable for generating the commentaries; or may further be a computing formula that is pre-established by skilled persons based on statistics of large amounts of data, is stored in the above electronic device, and is used for performing numerical computing on one or more numerical values in the eigenvectors obtained by feature extraction on the text to obtain a score for characterizing the text suitable for generating the commentary.

In some implementations, the electronic device may obtain the score computing model by pre-training through the following score computing model training operations.

First, a first training sample set may be acquired.

Here, a first training sample may include a text included in historical news and an annotation score corresponding to the historical news suitable for generating the commentary. For example, the annotation score suitable for generating the commentary may be manually annotated for the historical news.

Second, a model structure of an initial score computing model may be determined, and model parameters of the initial score computing model may be initialized.

Here, an executing body of the score computing model training operations maybe identical to or different from the executing body of the method for generating a video. If the executing body of the score computing model training operations is identical to the executing body of the method for generating a video, then the executing body of the score computing model training may store, after obtaining the score computing model by training, model structure information and parameter values of the model parameters of the trained score computing model locally. If the executing body of the score computing model training operations is different from the executing body of the method for generating a video, then the executing body of the score computing model training may send, after obtaining the score computing model by training, model structure information and parameter values of the model parameters of the trained score computing model to the executing body of the method for generating a video.

Here, since the score computing model may include computing models of various types, to-be-determined model structure information is different for computing models of different types.

Alternatively, the initial score computing model may include a convolutional neural network. The convolutional neural network is a multi-layer neural network, each layer is composed of a plurality of two-dimensional planes, and each plane is composed of a plurality of independent neurons. Then, here, it is necessary to determine which layers (e.g., a convolutional layer, a pooling layer, and an activation function layer) are included in an initial feature extracting model of a convolutional neural network type, a sequential connection relationship between the layers, which parameters (e.g., weight, bias, convolution step size) are included in each layer, and so on. The convolutional layer may be used for extracting features. For each convolutional layer, the following items may be determined: the number of convolution kernels, size of each convolution kernel, weight of each neuron in each convolution kernel, bias corresponding to each convolution kernel, step size between two adjacent convolutions, whether it is necessary to fill the convolutional layer, the number of filled pixel points, numerical values for filling (generally filled to 0), and the like. The pooling layer may be used for down sampling inputted information, to compress the amounts of data and parameters, and reduce overfitting. For each pooling layer, a pooling method of the pooling layer may be determined (e.g., taking an average value of a region or a maximum value of the region). The activation function layer is used for non-linear computing of the inputted information. For each activation function layer, a specific activation function may be determined. For example, the activation function may be various activation function variations of ReLU and ReLU, Sigmoid function, Tan h (hyperbolic tangent) function, Maxout function, and so on.

Then, the model parameters of the initial score computing model may be initialized. In practice, each model parameter of the initial score computing model may be initialized with some different small random numbers. The "small random number" is used to ensure that the model will not enter a saturation state due to very high weight, which will result in training failure. The "different" is used to ensure normal model learning.

Then, the text included in the historical news in the first training sample of the first training sample set and a score corresponding to the historical news suitable for generating the commentary may be used as an input and a desired output of the initial score computing model respectively, and the initial score computing model may be trained by machine learning.

Specifically, the text included in the historical news in the first training sample of the first training sample set maybe first inputted into the initial score computing model, to obtain the score corresponding to the text included in the historical news. Then, a difference between the score obtained by computing and the annotation score in the first training sample may be computed. Finally, the model parameters of the initial score computing model may be adjusted based on the difference obtained by computing, and the training may be terminated in the case of satisfying a preset first training termination condition. For example, the preset first training termination condition may include at least one of the following: a training duration exceeds a fourth preset duration, the number of times of training exceeds a first preset number of times, or the difference obtained by computing is less than a first preset difference threshold.

Here, the model parameters of the initial score computing model may be adjusted based on the difference between the obtained score and the annotation score in the first training sample by various implementations. For example, stochastic gradient descent (SGD), Newton's method, quasi-Newton method, conjugate gradient, heuristic optimization, and various other optimization algorithms that are known at present or are to be developed in the future may be employed.

Finally, the initial score computing model obtained by training may be determined for use as the pre-trained score computing model.

Step 2012: generating the commentary of the target news cluster based on target news.

The score of each piece of news suitable for generating the commentary in the target news cluster has been determined in step 2011. Here, the executing body may first determine a piece of news with a highest score suitable for generating a commentary in the target news cluster for use as the target news. Then, the commentary of the target news cluster may be generated based on the target news by various implementations.

In some implementations, step 2012 may be performed as follows: extracting a digest from a text included in the target news, and determining a digest text obtained by the extracting for use as the commentary of the target news cluster.

Figure 2C:
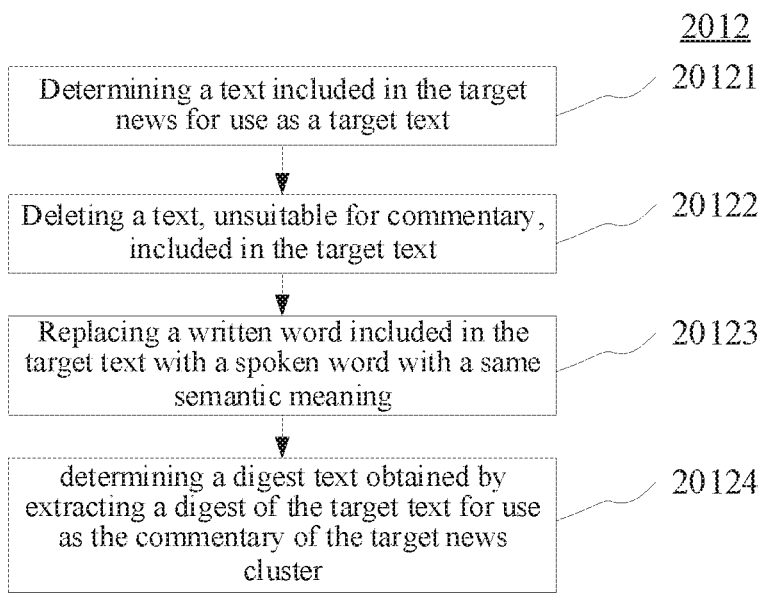
FIG. 2C is a resolved flowchart of step 2012 according to an embodiment of the present disclosure.

In some implementations, step 2012 may further include step 20121 to step 20124 shown in FIG. 2C. Referring to FIG. 2C, a resolved flowchart of step 2012 according to an embodiment of the present disclosure is shown.

Step 20121: determining a text included in the target news for use as a target text.

Here, the executing body may first determine the piece of news with the highest score suitable for generating the commentary in the target news cluster for use as the target news. Then, the text included in the target news may be determined for use as the target text.

Step 20122: deleting a text unsuitable for commentary included in the target text.

Here, the executing body may delete the text unsuitable for commentary included in the target text. The text unsuitable for commentary may be a text in a predetermined text set unsuitable for commentary. In practice, the text set unsuitable for commentary may be a text set pre-established by skilled persons based on statistics of texts that are unsuitable for commentary and are extracted from a large number of pieces of historical news (e.g., "reported by a staff writer," "see the photo above," "see the photo below," "reported by a front reporter," "important news provided by a front reporter," "a report provided by a front reporter," and "a news reporter interviews with on-site audiences").

After step 20122, ineffective information in the target text may be reduced, and then a ratio of effective information content of the finally generated commentary may be increased.

Step 20123: replacing a written word included in the target text with a spoken word with a same semantic meaning.

Here, the executing body may replace the written word included in the target text with the spoken word with the same semantic meaning. Here, the written word and the spoken word may be a written word and a corresponding spoken word in a predetermined corresponding relationship table between written words and spoken words. In practice, the corresponding relationship table between written words and spoken words may be a corresponding relationship table pre-established by skilled persons based on statistics of written words and corresponding spoken words with the same semantic meaning extracted from a large amount of corpus.

After step 20123, the written word in the target text is replaced with the spoken word, such that the target text is more suitable for commentary.

Step 20124: determining a digest text obtained by extracting a digest from the target text for use as the commentary of the target news cluster.

In some implementations, the executing body may directly determine the digest text obtained by extracting a digest from the target text for use as the commentary of the target news cluster.

In some implementations, step 20124 may be further performed as follows.

First, a maximum number of words of the commentary is determined based on a preset fastest speech rate and a preset longest audio duration.

Here, the preset fastest speech rate is used for characterizing, if a corresponding voice is to be generated for the commentary, the maximum number of words included in the generated voice within unit time (e.g., 1 second).

Here, the preset longest audio duration is used for characterizing, if the corresponding voice is to be generated for the commentary, a longest playing duration of the generated voice. For example, if a corresponding short video is to be generated for the commentary, then the preset longest audio duration may be 90 seconds.

Here, the preset fastest speech rate and the preset longest video duration may be pre-determined by skilled persons. Of course, an interface of modifying the preset fastest speech rate and the preset longest video duration may also be provided to modify the preset fastest speech rate and the preset longest video duration.

With the preset fastest speech rate and the preset longest video duration, a product of the preset fastest speech rate and the preset longest video duration may be determined for use as the maximum number of words of the commentary.

Then, a digest is extracted from the target text.

Here, the digest may be extracted from the target text by various implementations, and the number of words of the extracted digest text is less than the determined maximum number of words of the commentary.

Finally, the extracted digest text is determined for use as the commentary of the target news cluster.

Here, an extracted digest text with the number of words less than the maximum number of words of the commentary may be determined for use as the commentary of the target news cluster.

The number of words of the commentary determined by the above implementation may meet the requirements for the preset fastest speech rate and the preset longest audio duration.

It should be noted that the extracting of digest from a text is an existing technology that is widely studied and applied at present. The description will not be repeated here.

Step 2012 implemented by an alternative implementation shown in FIG. 2C may be used to reduce a ratio of the text unsuitable for commentary to the text included in the target news, and then increase a ratio of the text suitable for commentary, and replaces the written word with the spoken word, such that the text included in the target news is more suitable for generating a commentary complying with human speaking habits.

Step 202: generating a voice corresponding to each paragraph in the commentary using a speech synthesis technology.

Here, the executing body may generate the voice corresponding to each paragraph in the commentary using the speech synthesis technology.

It should be noted that the speech synthesis technology is an existing technology that is widely studied and applied at present. The description will not be repeated here.

Step 203: determining a candidate material resource set corresponding to the commentary based on a video and an image included in the target news cluster.

In the present embodiment, the executing body may determine the candidate material resource set corresponding to the commentary based on the video and the image included in the target news cluster by various implementations.

In some alternative implementations of the present embodiment, step 203 maybe performed as follows: determining the video and the image included in the target news cluster for use as the candidate material resource set corresponding to the commentary.

Figure 2D:
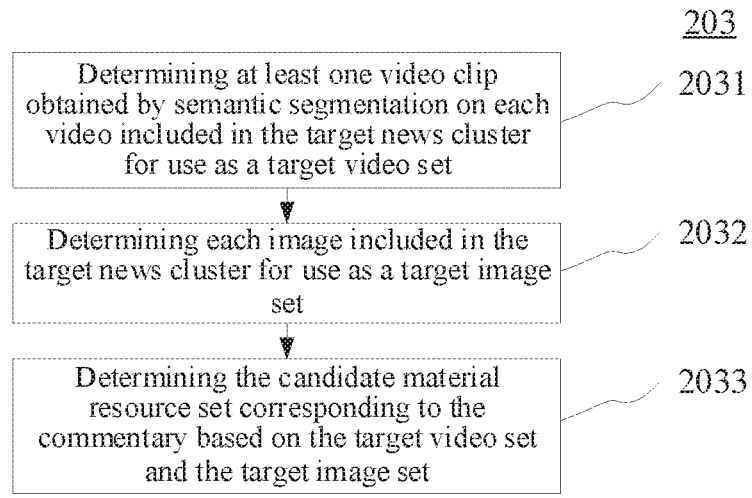
FIG. 2D is a resolved flowchart of step 203 according to an embodiment of the present disclosure.

In some alternative implementations of the present embodiment, step 203 may further include step 2031 to step 2033 shown in FIG. 2D. Referring to FIG. 2D, a resolved flowchart of step 203 according to an embodiment of the present disclosure is shown.

Step 2031: determining at least one video clip obtained by semantic segmentation on each video included in the target news cluster for use as a target video set.

Step 2032: determining each image included in the target news cluster for use as a target image set.

Step 2033: determining the candidate material resource set corresponding to the commentary based on the target video set and the target image set.

Here, the candidate material resource may be a video or image.

Figure 2E:
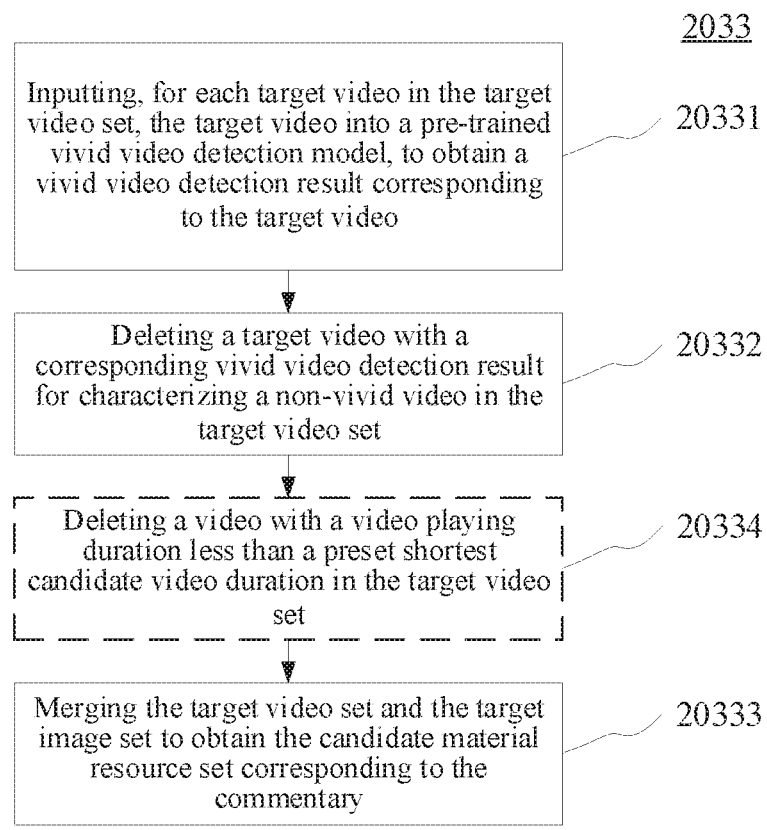
FIG. 2E is a resolved flowchart of step 2033 according to an embodiment of the present disclosure.

In some implementations, step 2033 may include step 20331 to step 20333 shown in FIG. 2E. Referring to FIG. 2E, a resolved flowchart of step 2033 according to an embodiment of the present disclosure is shown.

Step 20331: inputting, for each target video in the target video set, the target video into a pre-trained vivid video detection model, to obtain a vivid video detection result corresponding to the target video.

It should be noted that the vivid video detection model is used for characterizing a corresponding relationship between a video and a vivid video detection result for characterizing whether the video is a vivid video. Here, the vivid video detection model may be obtained by pre-training through the following vivid video detection model training operations.

First, a second training sample set may be acquired.

Here, an executing body of the vivid video detection model training operations may be identical to or different from the executing body of the method for generating a video. If the executing body of the vivid video detection model training operations is identical to the executing body of the method for generating a video, then the executing body of the vivid video detection model training operations may store, after obtaining the vivid video detection model by training, model structure information and parameter values of the model parameters of the trained vivid video detection model locally. If the executing body of the vivid video detection model training operations is different from the executing body of the method for generating a video, then the executing body of the vivid video detection model training operations may send, after obtaining the vivid video detection model by training, model structure information and parameter values of the model parameters of the trained vivid video detection model to the executing body of the method for generating a video.

Here, the second training sample may include a historical news video and an annotation result for characterizing whether the historical video is a vivid video. In practice, the annotation result for whether the historical news video is a vivid video may be manually annotated.

Here, the so-called vivid video is a video in which a user is interested, and which the user would like to watch, while a non-vivid video is a video in which a user is not interested, and which the user would not like to watch.

For example, a video clip in which a host sitting in a studio says: "Today is Feb. 1, 2019, Friday" may be annotated as a non-vivid video, while a video clip in which a national leader steps off a plane to meet with a leader of another country may be annotated as a vivid video.

Then, a model structure of an initial vivid video detection model may be determined, and model parameters of the vivid video detection model may be initialized.

Here, since the vivid video detection model may include models of various types, to-be-determined model structure information is different for models of different types.

Alternatively, the initial vivid video detection model may include a neural network, and then here, it is necessary to determine which layers (e.g., a convolutional layer, a pooling layer, and an activation function layer) are included in the initial vivid video detection model, a sequential connection relationship between the layers, which parameters are included in each layer (e.g., weight, bias, convolution step size), and so on.

Then, the model parameters of the initial vivid video detection model may be initialized. In practice, each model parameter of the initial vivid video detection model may be initialized with some different small random numbers. The "small random number" is used to ensure that the model will not enter a saturation state due to very high weight, which will result in training failure. The "different" is used to ensure normal model learning.

Then, the historical news video in the second training sample of the second training sample set and an annotation result corresponding to the historical news video maybe used as an input and a desired output of the initial vivid video detection model respectively, and the initial vivid video detection model may be trained by machine learning.

Specifically, the historical news video in the second training sample of the second training sample set maybe first inputted into the initial vivid video detection model, to obtain a practical vivid video detection result on whether the historical news video is a vivid video. Then, a difference between the obtained practical vivid video detection result and the annotation result in the second training sample may be computed. Finally, the model parameters of the initial vivid video detection model may be adjusted based on the difference obtained by computing, and the training may be terminated in the case of satisfying a preset second training termination condition. For example, the preset second training termination condition may include at least one of the following: a training duration exceeds a fifth preset duration, the number of times of training exceeds a second preset number of times, or the difference obtained by computing is less than a second preset difference threshold.

Here, the model parameters of the initial vivid video detection model may be adjusted based on the difference between the practical vivid video detection result and the annotation result in the training sample by various implementations. For example, stochastic gradient descent, Newton's method, quasi-Newton method, conjugate gradient, heuristic optimization, and various other optimization algorithms that are known at present or are to be developed in the future may be employed.

Finally, the initial vivid video detection model obtained by training may be determined for use as the pre-trained vivid video detection model.

Step 20332: deleting a target video with a corresponding vivid video detection result for characterizing a non-vivid video in the target video set.

That is, here, the non-vivid video in the target video set is deleted, while the vivid video in the target video set is retained.

Step 20333: merging the target video set and the target image set to obtain the candidate material resource set corresponding to the commentary.

The non-vivid video in the candidate material resource set obtained by the implementation shown in FIG. 2E is removed, while the vivid video is retained. The number of material resources in the candidate material resource set is reduced, thereby reducing consumption of required computer resources (e.g., a CPU resource, a memory resource, and an I/O resource) in subsequently determining a candidate material sequence corresponding to each paragraph in the commentary.

In some implementations, the executing body may further execute step 20334 before executing step 20333.

Step 20334: deleting a video with a video playing duration less than a preset shortest candidate video duration in the target video set.

Here, for a video with a playing duration less than a preset shortest candidate video duration in the target video set, the video reflects very little content, and then the video may have no existence value. It is necessary to delete the video from the target video set, thereby reducing the number of material resources in the candidate material resource set, reducing consumption of required computer resources (e.g., a CPU resource, a memory resource, and an I/O resource) in subsequently determining a candidate material sequence corresponding to each paragraph in the commentary.

In some alternative implementations of the present embodiment, step 203 may be further performed as follows.

First, at least one video clip obtained by performing semantic segmentation on each video included in the target news cluster is determined for use as the target video set.

Second, each image included in the target news cluster is determined for use as the target image set.

Then, the video with the video playing duration less than the preset shortest candidate video duration in the target video set is deleted.

Finally, the target video set and the target image set are combined to obtain the candidate material resource set corresponding to the commentary.

Step 204: determining a candidate material resource sequence corresponding to each paragraph in the commentary.

In the present embodiment, the executing body may employ various implementations, and for each paragraph in the commentary, select the candidate material resource from the candidate material resource set determined in step 203 to generate the candidate material resource sequence corresponding to the paragraph.

Figure 2F:
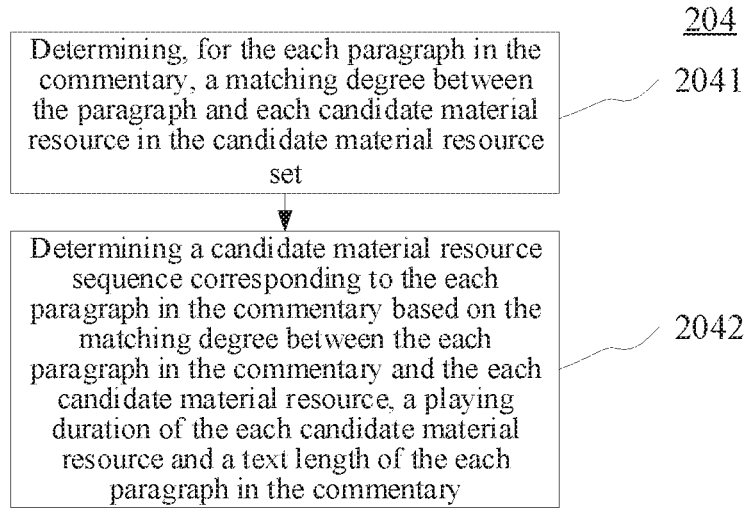
FIG. 2F is a resolved flowchart of step 204 according to an embodiment of the present disclosure.

In some alternative implementations of the present embodiment, step 204 may include step 2041 to step 2042 shown in FIG. 2F. Referring to FIG. 2F, a resolved flowchart of step 204 according to an embodiment of the present disclosure is shown.

Step 2041: determining, for each paragraph in the commentary, a matching degree between the paragraph and each candidate material resource in the candidate material resource set.

Here, the executing body may determine, for each paragraph in the commentary, a matching degree between the paragraph and each candidate material resource in the candidate material resource set by various implementations.

Specifically, since the candidate material resource may be a video or image, here, a matching degree between each paragraph in the commentary and a video in the candidate material resource set may be computed using various methods of computing a matching degree between a text and a video, and a matching degree between each paragraph in the commentary and an image in the candidate material resource set may be computed using various methods of computing a matching degree between a text and an image. This is not specifically limited in the present disclosure.

Figure 2G:
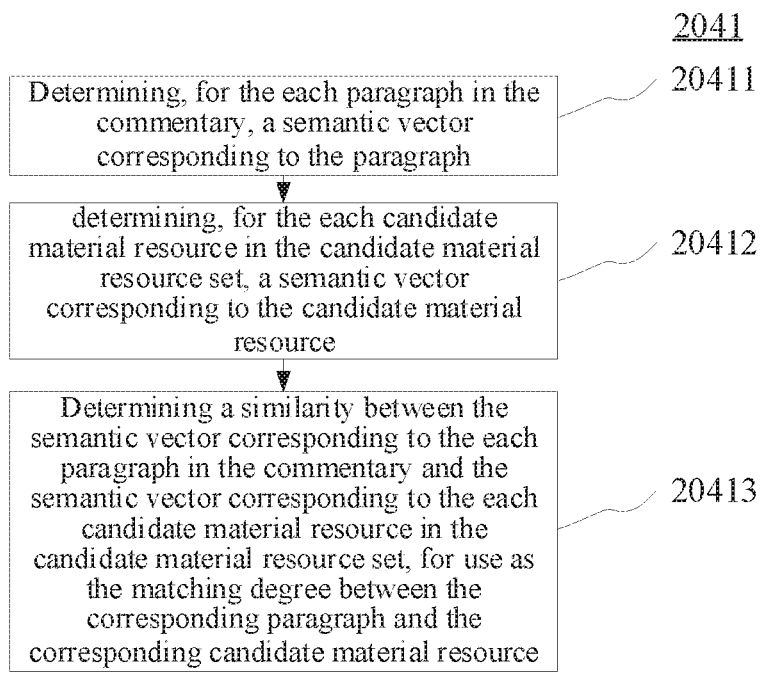
FIG. 2G is a resolved flowchart of step 2041 according to an embodiment of the present disclosure.

In some alternative implementations of the present embodiment, step 2041 may include step 20411 to step 20413 shown in FIG. 2G. Referring to FIG. 2G, a resolved flowchart of step 2041 according to an embodiment of the present disclosure is shown.

Step 20411: determining, for each paragraph in the commentary, a semantic vector corresponding to the paragraph.

Here, the semantic vector corresponding to the paragraph may be determined by various implementations, i.e., expressing the paragraph as a vector form to facilitate computing.

For example, the semantic vector corresponding to the paragraph may be generated using a bag-of-words model. Specifically, assuming that V is the number of terms included in a dictionary in the bag-of-words model, then for a paragraph P, assuming that the numbers of 1st term to V-th term in a dictionary included in the P are $x_1$ to $x_v$, respectively, then a vector corresponding to the paragraph P is $\{x_1, x_2, \ldots, x_v\}$.

For another example, a segmented term sequence corresponding to the paragraph may be further obtained by word segmentation on the paragraph, then for each segmented term in the obtained segmented term sequence, a term vector corresponding to the segmented term is queried in a predetermined term vector table, and then a semantic vector corresponding to the paragraph is determined based on the term vector corresponding to each segmented term in the obtained segmented term sequence. For example, a mean vector of the term vector corresponding to each segmented term in the obtained segmented term sequence may be determined for use as the semantic vector corresponding to the paragraph. For another example, a vector corresponding to a median of a value in each dimension of the term vector corresponding to each segmented term in the obtained segmented term sequence may be further determined for use as the semantic vector corresponding to the paragraph. Here, the term vector table is used for characterizing a corresponding relationship between a term and a term vector. The term vector table may be obtained by pre-training. For example, the term vector table may be obtained by training using a statistical-based method or a language model-based method.

For example, the statistical-based method may be a co-occurrence matrix method, which statisticizes the number of times of co-occurrence of terms within a window of a preset size, and uses the number of times of co-occurring terms around the terms for use as the term vector of the current term. Specifically, a co-occurrence matrix may be established from a large number of corpus texts to define a term vector corresponding to each term of terms occurring in the corpus text, and then obtain a term vector table.

For another example, the statistical-based method may further be singular value decomposition. Because the co-occurrence matrix method has high dimension and sparsity problems, the singular value decomposition decomposes a singular value of a matrix obtained by the co-occurrence matrix method, to obtain an orthogonal matrix, then normalizes the orthogonal matrix to obtain a matrix to define the term vector corresponding to each term of the terms occurring in the corpus text, and then obtains the term vector table.

The generating the term vector table based on a language model is performed by training a neural network language model (NNLM), and the term vector table is outputted accompanied with the language model. The basic idea behind the NNLM is to predict terms occurring in a context. This prediction on the context is essentially a kind of learning of statistical features of co-occurrence. As an example, the method of generating term vectors by the NNLM may include, but is not limited to, the following methods: Skip-gram, CBOW, LBL, NNLM, C&W, GloVe, and the like.

Step 20412: determining, for each candidate material resource in the candidate material resource set, a semantic vector corresponding to the candidate material resource.

Here, the semantic vector corresponding to the candidate material resource may be determined by various implementations.

Figure 2H:
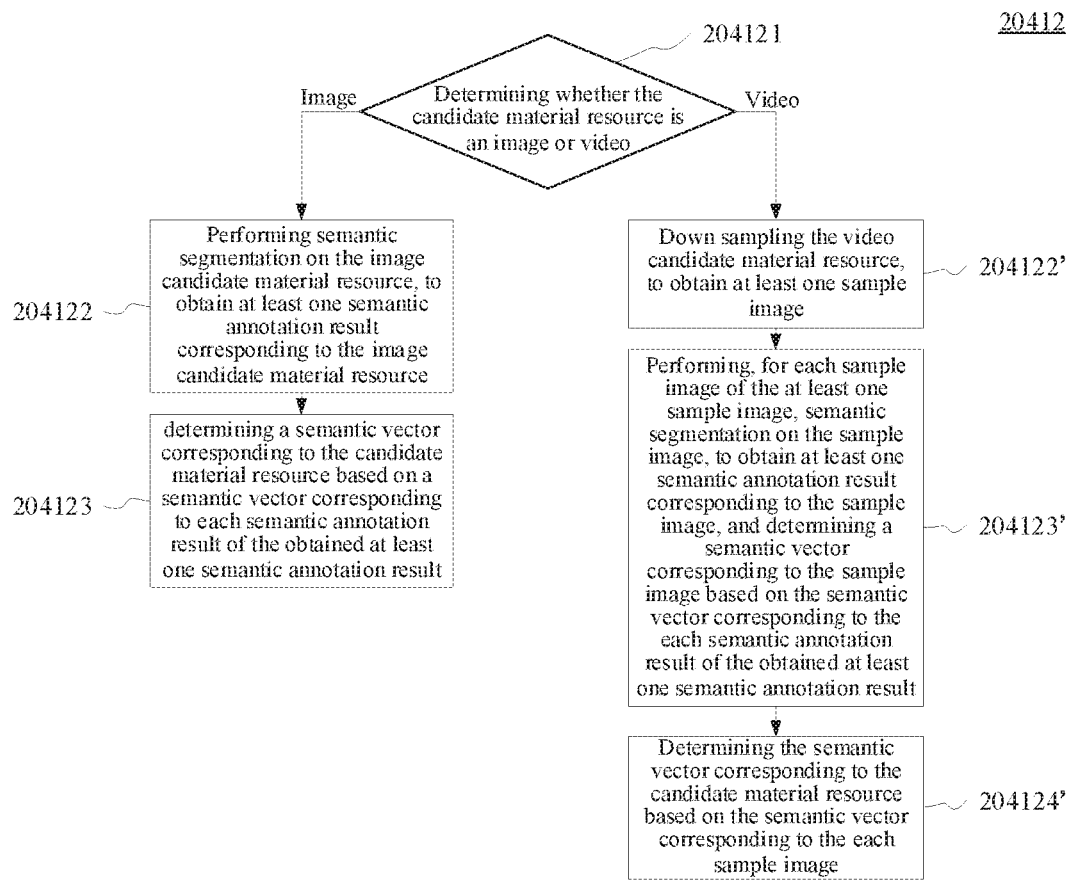
FIG. 2H is a resolved flowchart of step 20412 according to an embodiment of the disclosure.

In some implementations, step 20412 may include step 204121 to step 204123 shown in FIG. 2H. Referring to FIG. 2H, a resolved flowchart of step 20412 according to an embodiment of the present disclosure is shown.

Step 204121: determining whether the candidate material resource is an image or video.

If the candidate material resource is determined to be the image, then step 204122 is switched to.

If the candidate material resource is determined to be the video, then step 204122' is switched to.

Step 204122: performing semantic segmentation on the image candidate material resource, to obtain at least one semantic annotation result corresponding to the image candidate material resource.

Here, semantic segmentation on the image candidate material resource may be performed by various implementations in the case of determining the candidate material resource being an image instep 204121, to obtain at least one semantic annotation result corresponding to the image candidate material resource, where each semantic annotation result may be a term or phrase. For example, if the image candidate material resource is an image describing a lion chasing an antelope on grassland, then at least one semantic annotation result obtained by semantic segmentation on the image may be {"lion," "grassland," "antelope"}.

It should be noted that how to perform semantic segmentation on an image is an existing technology that is widely studied and applied at present. The description will not be repeated here.

Step 204123: determining a semantic vector corresponding to the candidate material resource based on a semantic vector corresponding to each semantic annotation result of the obtained at least one semantic annotation result.

At least one semantic annotation result has been obtained in step 204122. Here, the semantic vector corresponding to each semantic annotation result of the at least one semantic annotation result obtained in step 204122 may be first determined. Then, the semantic vector corresponding to the candidate material resource may be determined based on the semantic vector corresponding to each semantic annotation result of the at least one semantic annotation result, for example, using a mean vector or median vector.

Here, related description in step 20411 may be referred to for the method of determining the term vector corresponding to each semantic annotation result.

After step 204123, step 20412 is completed.

Step 204122': down sampling the video candidate material resource, to obtain at least one sample image.

Here, in the case of determining the candidate material resource being a video in step 204121, the video candidate material resource may be down sampled by various implementations, to obtain the at least one sample image. For example, a second preset number (e.g., 1) of frames of images may be sampled at intervals of a first preset number (e.g., 10) of frames of images in the candidate material resource, to obtain the at least one sample image.

Step 204123': performing, for each sample image of the at least one sample image, semantic segmentation on the sample image, to obtain at least one semantic annotation result corresponding to the each sample image, and determining a semantic vector corresponding to the each sample image based on the semantic vector corresponding to the each semantic annotation result of the obtained at least one semantic annotation result.

Here, specific operations of the performing semantic segmentation on each sample image, and determining a semantic vector corresponding to the sample image based on the semantic vector corresponding to each semantic annotation result of the obtained at least one semantic annotation result in step 204123' are basically identical to corresponding specific operations described instep 204123. The description will not be repeated here.

Step 204124': determining the semantic vector corresponding to the candidate material resource based on the semantic vector corresponding to the each sample image.

Because the semantic vector corresponding to each sample image is obtained in step 204123', here, the semantic vector corresponding to the candidate material resource may be determined based on the semantic vector corresponding to each sample image obtained in step 204123'. For example, a mean vector of the semantic vector corresponding to each sample image may be determined for use as the semantic vector corresponding to the candidate material resource. For another example, a vector corresponding to a median of a value in each dimension of the semantic vector corresponding to each sample image may be further determined for use as the semantic vector corresponding to the candidate material resource.

After step 204124', step 20412 is completed.

Step 20413: determining a similarity between the semantic vector corresponding to the each paragraph in the commentary and the semantic vector corresponding to the each candidate material resource in the candidate material resource set, for use as the matching degree between the corresponding paragraph and the corresponding candidate material resource.

Here, the similarity between the semantic vector corresponding to each paragraph in the commentary and the semantic vector corresponding to each candidate material resource in the candidate material resource set may be computed using various methods of computing a similarity between vectors. For example, the similarity between the vectors may be determined by computing Euclidean distance, Manhattan distance, Chebyshev distance, Minkowski distance, standardized Euclidean distance, Mahalanobis distance, cosine similarity, Hamming distance, Jaccard distance, Jaccard similarity coefficient, correlation coefficient, correlation distance, information entropy, and the like between the vectors.

Step 2042: determining a candidate material resource sequence corresponding to each paragraph in the commentary based on the matching degree between the each paragraph in the commentary and the each candidate material resource, a playing duration of the each candidate material resource and a text length of the each paragraph in the commentary.

Here, the executing body may determine the candidate material resource sequence corresponding to each paragraph in the commentary based on the matching degree between each paragraph in the commentary and each candidate material resource, the playing duration of each candidate material resource and the text length of each paragraph in the commentary determined in step 2041 by various implementations. A playing duration of an image is a preset image playing duration.

It should be noted that, here, the playing duration of a video type candidate material resource is an inherent attribute of the video type candidate material resource, and is constant. For an image type candidate material resource, here, a playing duration of each image type candidate material resource is set as a constant preset image playing duration (e.g., 3 seconds). Thus, all candidate material resources may have a constant playing duration attribute.

In some implementations, step 2042 may be performed as follows.

For each paragraph in the commentary, the candidate material resource sequence corresponding to the paragraph is determined using a first preset optimization algorithm, with a playing duration of the candidate material resource sequence corresponding to the paragraph being equal to the playing duration corresponding to the paragraph as a constraint condition, with maximizing the matching degree between the candidate material resource sequence corresponding to the paragraph and the paragraph as an optimization target.

That is, respectively for each paragraph in the commentary, sequentially arranged candidate material resources are selected from the candidate material resource set determined in step 203 to form the candidate material resource sequence corresponding to the paragraph, and the playing duration of the selected candidate material resource sequence corresponding to the paragraph is equal to the playing duration corresponding to the paragraph.

Here, the playing duration of the candidate material resource sequence is a sum of the playing duration of each candidate material resource in the candidate material resource sequence. The playing duration corresponding to the paragraph is determined by the number of words in the paragraph and a preset speech rate. For example, the preset speech rate is N words per second, the number of words in the paragraph is M, and then the playing duration corresponding to the paragraph is L second, where L is a ratio obtained by dividing M by N.

Here, the first preset optimization algorithm may be various optimization algorithms with a constraint condition and an optimization target. For example, the first preset optimization algorithm may include, but is not limited to: a dynamic programming algorithm and a shortest path optimization algorithm.

In some implementations, step 2042 may be further performed as follows: determining the candidate material resource sequence corresponding to each paragraph in the commentary using a second preset optimization algorithm, with the playing duration of the candidate material resource sequence corresponding to each paragraph in the commentary being equal to the playing duration corresponding to the paragraph as a constraint condition, with maximizing a sum of a matching degree between the candidate material resource sequence corresponding to each paragraph in the commentary and the corresponding paragraph as an optimization target.

Compared with the above alternative implementations, the optimization target here may be different from the optimization target of the above alternative implementations. In the above alternative implementations, each paragraph is optimized respectively with maximizing the matching degree between each paragraph and the candidate material resource sequence corresponding to the paragraph as an optimization target. Moreover, the alternative implementation here optimizes each paragraph in the commentary on the whole with maximizing the sum of the matching degree between the candidate material resource sequence corresponding to each paragraph in the commentary and the corresponding paragraph as the optimization target.

Here, the second preset optimization algorithm may further be various optimization algorithms with a constraint condition and an optimization target. For example, the second preset optimization algorithm may include, but is not limited to: a dynamic programming algorithm and a shortest path optimization algorithm.

In some implementations, candidate material resources in the candidate material resource sequence corresponding to each paragraph in the commentary determined in step 2042 may be mutually different. Thus, repeating images or videos will not occur in subsequently generating a corresponding video for the commentary, and readability and vividness of the generated video maybe increased. It will be appreciated that if the candidate material resources in the candidate material resource sequence corresponding to each paragraph determined in step 2042 are mutually different, then it is necessary to add the determined constraint condition that the candidate material resources in the candidate material resource sequence corresponding to each paragraph in the commentary are mutually different to the constraint condition in the above two alternative implementations.

Step 205: generating a video corresponding to the commentary based on the voice corresponding to the each paragraph in the commentary and the candidate material resource sequence.

In the present embodiment, the executing body may generate a video corresponding to the commentary based on the voice corresponding to each paragraph in the commentary and the candidate material resource sequence.

In some implementations, step 205 may be performed as follows.

First, the voice corresponding to each paragraph may be connected in sequence from front to rear of each paragraph in the commentary, to obtain a first audio.

Second, a video corresponding to each paragraph may be connected in sequence from front to rear of each paragraph in the commentary, to obtain a first video.

Here, the video corresponding to each paragraph is a video obtained by sequentially connecting the candidate material resources in the candidate material resource sequence corresponding to the paragraph.

Finally, the obtained first audio and first video are determined for use as an audio part and a video part in the video corresponding to the commentary respectively.

Figure 2I:
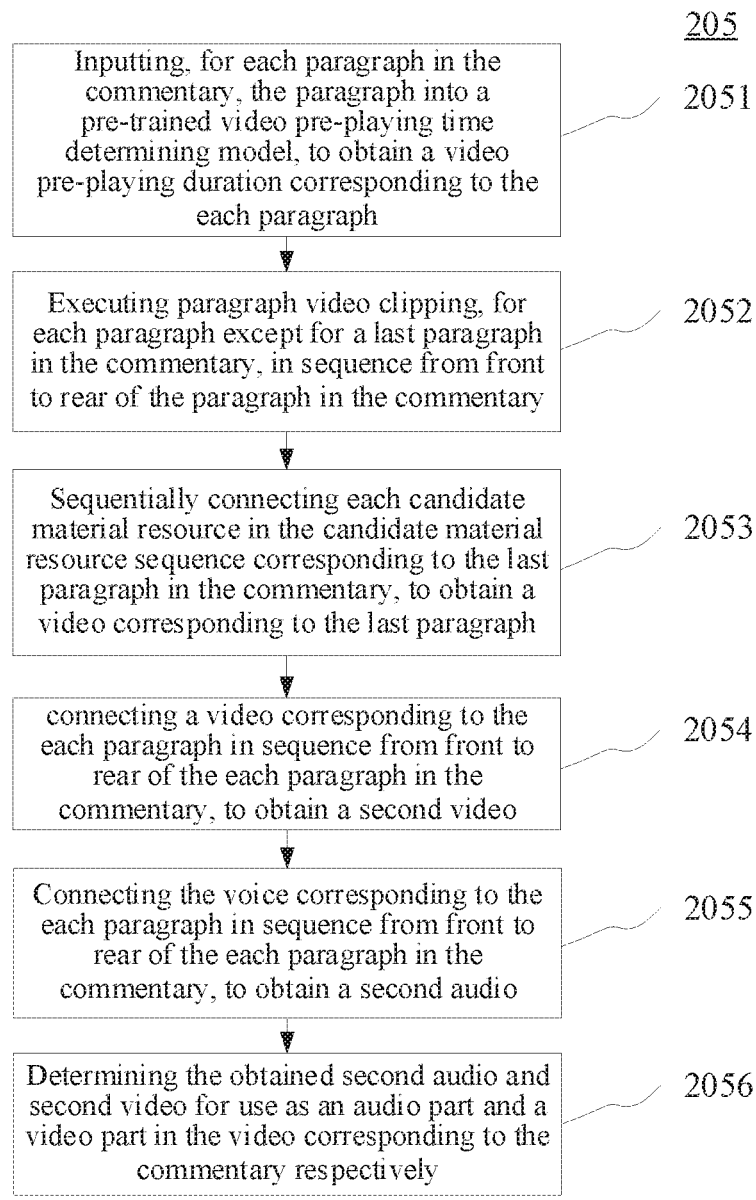
FIG. 2I is a resolved flowchart of step 205 according to an embodiment of the present disclosure.

In some implementations, step 205 may further include step 2051 to step 2056 shown in FIG. 2I. Referring to FIG. 2I, a resolved flowchart of step 205 according to an embodiment of the present disclosure is shown.

Step 2051: inputting, for each paragraph in the commentary, the paragraph into a pre-trained video pre-playing time determining model, to obtain a video pre-playing duration corresponding to the each paragraph.

Here, the video pre-playing duration determining model is used for characterizing a corresponding relationship between a text and a video pre-playing duration corresponding to the text.

In practice, a manually clipped news video usually has been played for a short period of time before a host speaks. In order to make the video generated for the commentary be more in line with human watching habits, and be more like the manually clipped news video, the video pre-playing time determining model may be pre-trained based on a large number of third training samples. The third training samples here may include a text included in a sample news video and an annotated duration of a video in the sample news video prior to a commentary voice. The training the video pre-playing time determining model may be basically identical to the above training the score computing model or training the vivid video detection model. The description will not be repeated here.

Step 2052: executing paragraph video clipping, for each paragraph except for a last paragraph in the commentary, in sequence from front to rear of each paragraph in the commentary.

Here, the paragraph video clipping may include the following operations.

First, the video pre-playing duration corresponding to a paragraph following the paragraph is determined for use as a video clipping duration.

Second, each candidate material resource in the candidate material resource sequence corresponding to the paragraph is sequentially connected to obtain the video corresponding to the paragraph.

Third, a video of the video clipping duration at a tail of the video corresponding to the paragraph is clipped.

That is, this scheme pre-plays a video corresponding to each paragraph except for a first paragraph in the commentary, and overwrites a tail of a video of a paragraph prior to the paragraph. The video pre-playing and video overwriting duration is the video pre-playing duration corresponding to the paragraph determined in step 2051.

Step 2053: sequentially connecting each candidate material resource in the candidate material resource sequence corresponding to the last paragraph in the commentary, to obtain a video corresponding to the last paragraph.

Step 2054: connecting a video corresponding to each paragraph in sequence from front to rear of the each paragraph in the commentary, to obtain a second video.

Step 2055: connecting the voice corresponding to each paragraph in sequence from front to rear of the each paragraph in the commentary, to obtain a second audio.

Step 2056: determining the obtained second audio and second video for use as an audio part and a video part in the video corresponding to the commentary respectively.

Figure 2J:
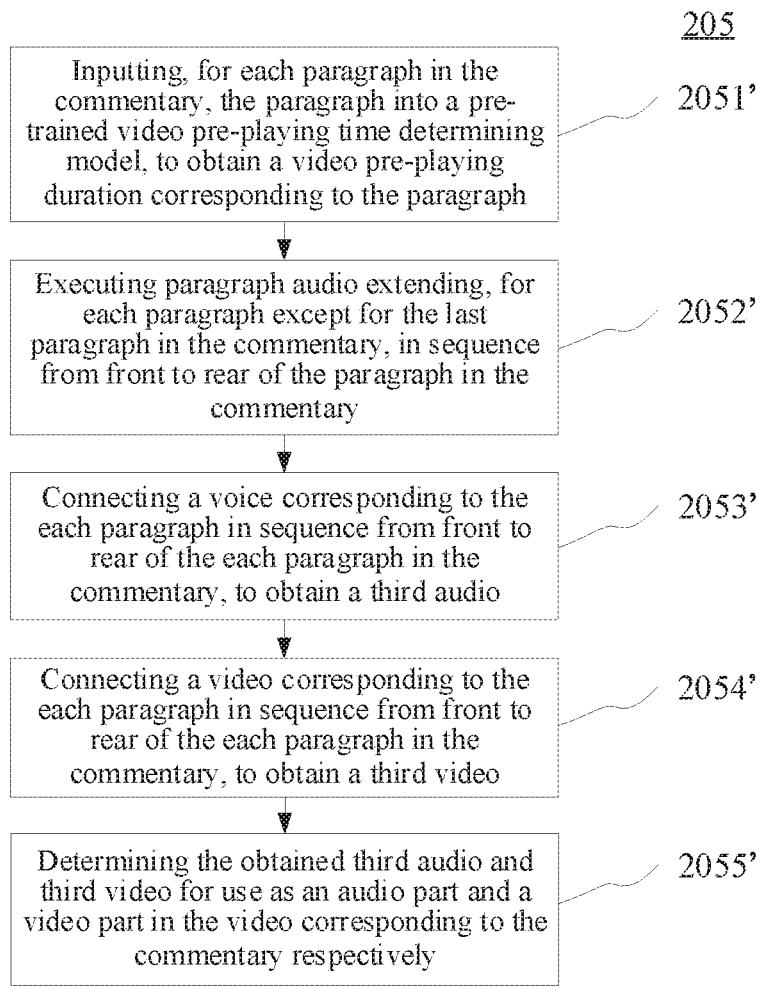
FIG. 2J is a resolved flowchart of step 205 according to another embodiment of the present disclosure.

In some alternative implementations of the present embodiment, step 205 may further include step 2051' to step 2055' shown in FIG. 2J. Referring to FIG. 2J, a resolved flowchart of step 205 according to another embodiment of the present disclosure is shown.

Step 2051': inputting, for each paragraph in the commentary, the paragraph into a pre-trained video pre-playing time determining model, to obtain a video pre-playing duration corresponding to the each paragraph.

Here, specific operations of step 2051' are basically identical to the operations of step 2051. The description will not be repeated here.

Step 2052': executing paragraph audio extending, for each paragraph except for the last paragraph in the commentary, in sequence from front to rear of the paragraph in the commentary.

Here, the paragraph audio extending may include the following operations.

First, the video pre-playing duration corresponding to a paragraph following the paragraph is determined for use as an audio extending duration.

Second, a mute playing duration of the determined audio extending duration is added to a tail of the voice corresponding to the paragraph.

That is, this scheme pre-plays the video corresponding to each paragraph except for the first paragraph in the commentary, and adds a mute playing duration to a tail of an audio of a paragraph prior to the paragraph. The video pre-playing and audio extending duration is the video pre-playing duration corresponding to the paragraph determined in step 2051'.

Step 2053': connecting the voice corresponding to each paragraph in sequence from front to rear of the each paragraph in the commentary, to obtain a third audio.

Step 2054': connecting a video corresponding to each paragraph in sequence from front to rear of the each paragraph in the commentary, to obtain a third video.

Here, the video corresponding to each paragraph is a video obtained by sequentially connecting the candidate material resources in the candidate material resource sequence corresponding to the paragraph.

Step 2055': determining the obtained third audio and third video for use as an audio part and a video part in the video corresponding to the commentary respectively.

Figure 3:
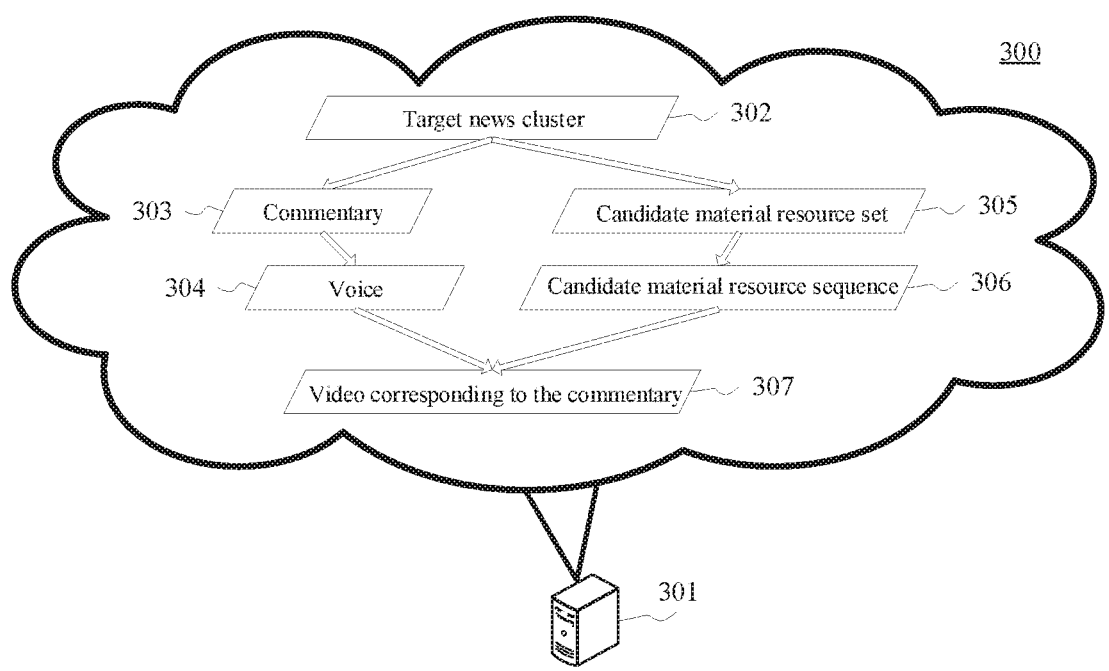
FIG. 3 is a schematic diagram of an application scenario of the method for generating a video according to an embodiment of the present disclosure.

Further referring to FIG. 3, FIG. 3 is a schematic diagram of an application scenario of the method for generating a video according to the present embodiment. In the application scenario of FIG. 3, a server 301 providing support for a news website may first determine a commentary 303 of a target news cluster 302; then, the server 301 may generate a voice 304 corresponding to each paragraph in the commentary 303 using a speech synthesis technology; then, the server 301 may determine a candidate material resource set 305 corresponding to the commentary based on a video and an image included in the target news cluster 302; then, the server 301 may determine a candidate material resource sequence 306 corresponding to each paragraph in the commentary 303; and finally, the server 301 may generate a video 307 corresponding to the commentary based on the voice 304 corresponding to each paragraph in the commentary 303 and the candidate material resource sequence 306.

The method according to the above embodiments of the present disclosure first determines a commentary of a target news cluster, each piece of news in the target news cluster being specific to a given news event; then generates a voice corresponding to each paragraph in the commentary using a speech synthesis technology; then determines a candidate material resource set corresponding to the commentary based on a video and an image included in the target news cluster, the candidate material resource being a video or image; then determines a candidate material resource sequence corresponding to each paragraph in the commentary; and finally generates a video corresponding to the commentary based on the voice corresponding to each paragraph in the commentary and the candidate material resource sequence, thereby achieving generating the video with the commentary for the target news cluster.

Figure 4A:
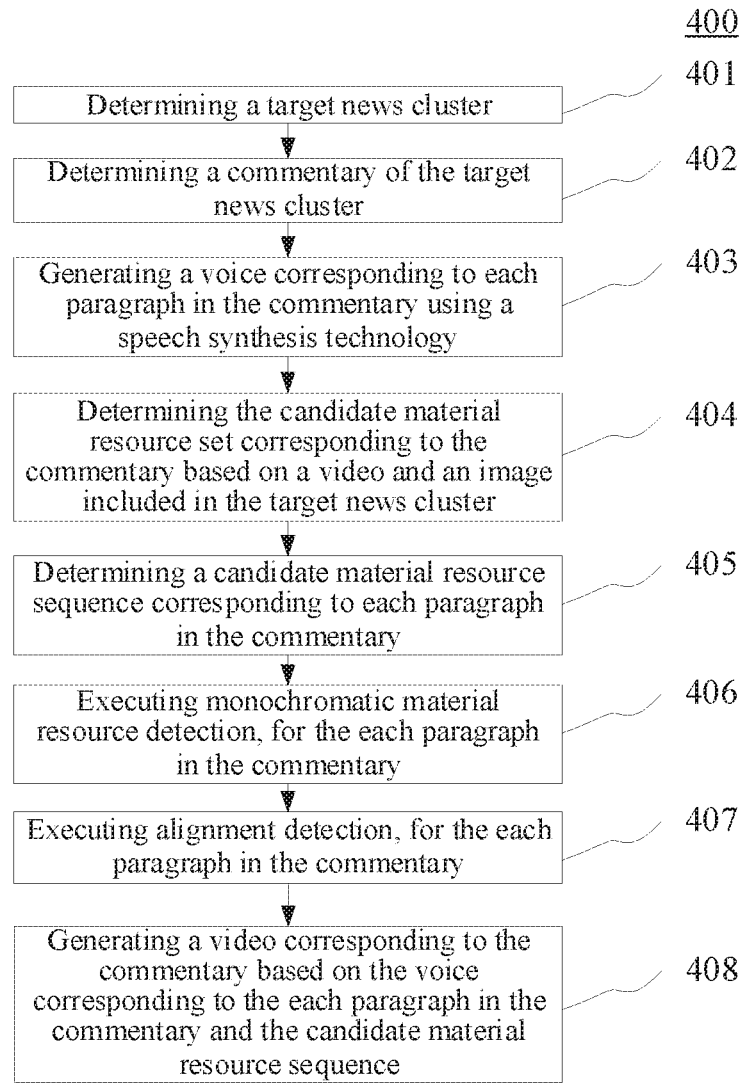
FIG. 4A is a flowchart of the method for generating a video according to another embodiment of the present disclosure.

Further referring to FIG. 4A, a process 400 of the method for generating a video according to another embodiment of the present disclosure is shown. The process 400 of the method for generating a video includes the following steps.

Step 401: determining a target news cluster.

In the present embodiment, an executing body (e.g., the server shown in FIG. 1) of the method of generating a video may determine the target news cluster by various implementations. The target news cluster is composed of at least one piece of news for a given news event.

Figure 4B:
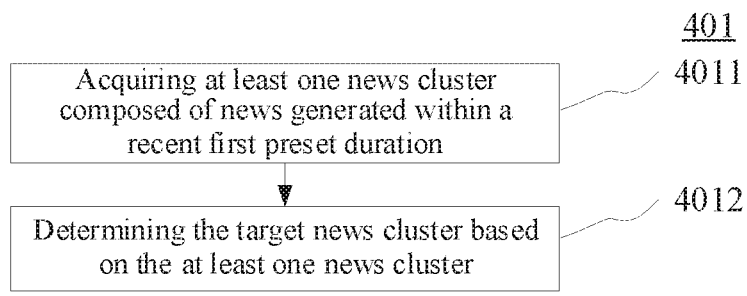
FIG. 4B is a resolved flowchart of step 401 according to an embodiment of the present disclosure.

In some alternative implementations of the present embodiment, step 401 may include step 4011 to step 4012 shown in FIG. 4B. Referring to FIG. 4B, a resolved flowchart of step 401 according to an embodiment of the present disclosure is shown.

Step 4011: acquiring at least one news cluster composed of news generated within a recent first preset duration.

Here, the executing body (e.g., the server shown in FIG. 1) may acquire at least one news cluster composed of news generated within the recent first preset duration locally or remotely from an electronic device connected to the executing body via a network, where each piece of news in each news cluster is specific to a given news event, and different news clusters are specific to different news events.

In practice, the acquired news may be marked with a corresponding news event. Thus, the executing body may first acquire news generated within a recent first preset duration (e.g., within one day), and then form different news clusters including acquired at least one piece of news based on corresponding different news events.

It will be appreciated that, when the acquired news is not marked with the corresponding news event, the executing body may first acquire the news generated within the recent first preset duration (e.g., within one day), then cluster the acquired news by various implementations, form a news cluster including news clustered into a given category, news of different clusters belonging to different news clusters, and then obtain at least one news cluster. For example, in practice, news will generally have a news headline. The executing body may cluster a news headline of each piece of acquired news, and use a cluster of news headlines as a cluster of news corresponding to the news headlines.

Step 4012: determining the target news cluster based on the at least one news cluster.

Then, the executing body (e.g., the server shown in FIG. 1) may determine the target news cluster based on the at least one news cluster by various implementations.

Here, the target news cluster may be a news cluster, or at least two news clusters.

When the target news cluster is one news cluster, the executing body may execute subsequent step 402 to step 408 using the determined one news cluster as the target news cluster.

When the determined target news cluster is at least two news clusters, the executing body may execute step 402 to step 408 using each news cluster of the determined at least two news clusters as the target news cluster. That is, assuming that the determined target news cluster is N news clusters, and N is a positive integer greater than or equal to 2, then the above executing body may execute step 402 to step 408 using each news cluster of the determined N news clusters as the target news cluster.

In some implementations, step 4012 may be performed as follows.

First, each news cluster of the at least one news cluster determined in step 4011 is ranked in descending order of the number of pieces of news generated within a recent second preset duration within the news cluster.

Here, the second preset duration may be identical to, or different from, the first preset duration.

Then, each news cluster ranked within a preset ranking range of the at least one news cluster is determined for use as the target news cluster.

Here, the preset ranking range maybe in various forms. For example, the preset ranking range may be in a ratio or percentage form. As an example, the preset ranking range may be from top 10% to top 20%. As another example, the ranking range may alternatively be a ranking number range. As an example, the preset ranking range may be from top 10 to top 20 of the ranking number.

In practice, news clusters with a maximum number and a minimum number of pieces of news generated within the recent second preset duration in the at least one news cluster of the target news clusters determined in accordance with the preset ranking range may be removed, i.e., the target news cluster is neither specific to a hottest news event, nor specific to a coldest news event, but for a news event of a moderate hot degree. For the hottest news event, because most people have known about the news event, a probability of a user reading a commentary and a video corresponding to the commentary generated for the hottest news event will be relatively low. Therefore, the commentary or the video corresponding to the commentary is not generated for a news cluster corresponding to the hottest news event, thereby reducing the resource (such as CPU resource, memory resource, and I/O resource) consumption. Conversely, for the coldest news event, people is not interested in the news event, basically nobody knows about this news event, and even if a commentary and a video corresponding to the commentary are generated for the coldest news event, the user will not be interested. Then, a probability of the user reading the commentary and the video corresponding to the commentary generated for the coldest news event will be relatively low, too. Therefore, the commentary or the video corresponding to the commentary is not generated for a news cluster corresponding to the coldest news event, thereby reducing the resource (such as CPU resource, memory resource, and I/O resource) consumption. It will be appreciated that, the hottest news event or coldest news event here may be at least one news event.

In some implementations, step 4012 may be further performed as follows: each excellent news cluster of the at least one news cluster is determined for use as the target news cluster.

Here, the number of images included in news included in the excellent news cluster is greater than a preset minimum number of images and the number of videos included in the news included in the excellent news cluster is greater than a preset minimum number of videos. For example, the preset minimum number of images and the preset minimum number of videos may be 5.

Here, the preset minimum number of images and the preset minimum number of videos maybe preset by skilled persons based on statistical analysis of a large number of pieces of historical news. The preset minimum number of images and the preset minimum number of videos may be further reset as required.

In practice, if news in a news cluster includes a large number of images and includes a large number of videos, then the news cluster is relatively vivid and interesting, and easily arouses a user's reading interest. Generating a commentary and a video corresponding to the commentary for such a news cluster will also arouse a user's interest, and then increases a probability of the user reading a commentary and a video corresponding to the commentary generated for the excellent news cluster. Therefore, the commentary and the video corresponding to the commentary are generated merely for the excellent news cluster, thereby reducing the resource (such as CPU resource, memory resource, and I/O resource) consumption.

In some implementations, step 4012 may be further performed as follows.

First, for each news cluster of the at least one news cluster, a news event theme corresponding to the news cluster and a current occurrence frequency of the determined news event theme are determined based on each piece of news in the news cluster.

Here, the news event theme corresponding to the news cluster and the current occurrence frequency of the determined news event theme maybe determined by various implementations. Here, the news event theme corresponding to the news cluster characterizes a semantic meaning expressed by each piece of news in the news cluster. In practice, the news event theme may include at least one term or phrase, and the current occurrence frequency of the determined news event theme refers to an occurrence frequency of the determined news event theme in each piece of news in the news cluster.

For example, a news event theme corresponding to each piece of news in the news cluster may be determined using LDA (Latent Dirichlet Allocation) based on each piece of news in the news cluster determined in step 4011, and a probability distribution of the determined news event theme is determined for use as the current occurrence frequency of the determined news event theme.

Then, a frequency difference of the current occurrence frequency of the news event theme corresponding to each news cluster of the at least one news cluster minus a historical occurrence frequency of the news event theme is determined.

Here, the historical occurrence frequency of the news event may be determined based on a piece of historical news with the same news event theme corresponding to the news cluster in the historical news.

Finally, a news cluster with the frequency difference of the news event theme corresponding to the at least one news cluster greater than a preset frequency difference threshold is determined for use as the target news cluster.

Here, if the frequency difference of the news event theme corresponding to the news cluster is greater than the preset frequency difference threshold, then the news event corresponding to the news cluster is essentially not outstanding, but attracts unexpected attention, and then importance should be attracted to the news cluster. More users may read a commentary and a video corresponding to the commentary generated for such a news cluster.

It should be noted that, the executing body may further determine the target news cluster in combination with at least two implementations of the first, second or third alternative implementations.

Step 402: determining a commentary of the target news cluster.

Step 403: generating a voice corresponding to each paragraph in the commentary using a speech synthesis technology.

Step 404: determining the candidate material resource set corresponding to the commentary based on the video and the image included in the target news cluster.

Step 405: determining a candidate material resource sequence corresponding to each paragraph in the commentary.

Specific operations of step 402, step 403, step 404, and step 405 in the present embodiment are basically identical to the operations of step 201, step 202, step 203, and step 204 in the embodiment shown in FIG. 2A. The description will not be repeated here.

Step 406: executing monochromatic material resource detection, for each paragraph in the commentary.

In the present embodiment, the executing body may execute the following monochromatic material resource detection, for each paragraph in the commentary: deleting, for each material resource in the candidate material resource sequence corresponding to the paragraph, in response to determining the material resource being a video and a monochromatic image frame being present in the video material resource, the monochromatic image frame in the material resource; and deleting, in response to determining the material resource being an image and the image material resource being a monochromatic image, the material resource from the candidate material resource sequence corresponding to the paragraph.

Here, one pixel value is present in the monochromatic image or monochromatic image frame, and a ratio of the number of pixel points with a pixel value of each pixel point in the monochromatic image or monochromatic image frame being the one pixel value to the number of pixel points included in the monochromatic image or monochromatic image frame exceeds a preset ratio. For example, the preset ratio may be 0.8. For example, pixel values of all pixel points in a black image are all used for representing black.

In practice, since the monochromatic image or monochromatic image frame carries limited information or carries no information, then the monochromatic image or monochromatic image frame is retained, and a video corresponding to a subsequently generated commentary substantially will not carry useful information. Thus, it is necessary to delete the monochromatic image or monochromatic image frame.

Step 407: executing alignment detection, for each paragraph in the commentary.

In the present embodiment, since the monochromatic image or monochromatic image frame in the candidate material resource sequence corresponding to the paragraph in the commentary may be deleted in step 406, then a duration of the voice corresponding to the paragraph in the commentary may be longer than a playing duration of the candidate material resource sequence corresponding to the paragraph. Therefore, the executing body may perform the following alignment detection. The alignment detection may include the following operations: extending, in response to determining a playing duration of the voice corresponding to the paragraph being greater than the playing duration of the candidate material resource sequence corresponding to the paragraph, a playing duration of an image type candidate material resource in the candidate material resource sequence corresponding to the paragraph, or selecting a candidate material resource from the candidate material resource set, and adding the selected candidate material resource to the candidate material resource sequence corresponding the paragraph, such that the playing duration of the voice corresponding to the paragraph is equal to the playing duration of the candidate material resource sequence corresponding to the paragraph.

After step 407, for each paragraph in the commentary, the playing duration of the voice corresponding to the paragraph is equal to the playing duration of the candidate material resource sequence corresponding to the paragraph.

Step 408: generating a video corresponding to the commentary based on the voice corresponding to each paragraph in the commentary and the candidate material resource sequence.

Specific operations of step 408 in the present embodiment are basically identical to the operations of step 205 in the embodiment shown in FIG. 2A. The description will not be repeated here.

step 409: sending the video corresponding to the commentary to a terminal device.

In the present embodiment, the executing body may send the video corresponding to the commentary generated in step 408 to the terminal device. Here, the terminal device may be the electronic device connected to the executing body via the network. Thus, the terminal device may, in response to receiving the video sent by the executing body, present the received video, and then achieve presenting the video corresponding to the commentary of the target news cluster on the terminal device. The user may quickly know about a news event to which the target news cluster is specific by watching the presented video corresponding to the commentary of the target news cluster on the terminal device, without the need for knowing about the news event to which the target news cluster is specific by the user by reading texts, thereby improving the user's efficiency in acquiring news event information.

In some alternative implementations of the present embodiment, the executing body may further execute step 410 to step 415 below after executing step 409.

Step 410: acquiring a current value of at least one parameter in a process from determining the commentary of the target news cluster to generating the video corresponding to the commentary.

That is, the executing body here needs to acquire the current value of the at least one parameter involved in a process of executing step 401 to step 408. For example, the at least one parameter may include at least one of the following items: first preset duration, second preset duration, third preset duration, preset fastest speech rate, preset longest audio duration, preset longest video duration, preset shortest candidate video duration, first preset optimization algorithm, second preset optimization algorithm, preset image playing duration, preset ranking range, preset minimum number of images, preset minimum number of videos, preset frequency difference threshold, or preset ratio.

Step 411: determining a video evaluation score of the video corresponding to the commentary.

Here, the executing body may determine the video evaluation score of the video corresponding to the commentary by various implementations. Here, the video evaluation score of the video corresponding to the commentary reflects a comprehensive score of user's evaluations on various aspects of the video corresponding to the commentary. For example, the video evaluation score may reflect at least one of the following: whether the user would like to watch the video, a matching degree between the generated video and the commentary, a matching degree between the generated video and a manually clipped video, or a matching degree between the generated video and the news event to which the news cluster is specific.

In some implementations, the user may be provided with a user interface for evaluating the video corresponding to the commentary of the target news cluster generated based on the current value of the at least one parameter on the executing body or other electronic devices (e.g., the terminal device shown in FIG. 1) connected to the executing body via the network. Then, the executing body may receive an evaluation score inputted by the user for the video corresponding to the commentary of the target news cluster generated based on the current value of the at least one parameter on the user interface locally or remotely from the electronic device. Thus, the executing body may acquire the video evaluation score of the video corresponding to the commentary generated based on the current value of the at least one parameter watched by at least one user, and then determine an average value of the acquired each video evaluation score for use as the video evaluation score of the video corresponding to the commentary generated based on the current value of the at least one parameter.

In some implementations, step 411 may be further performed as follows.

First, watching behavior information of at least one user watching the video corresponding to the commentary is acquired. The watching behavior information is used for characterizing various behaviors of the user in a process of watching the video corresponding to the commentary.

In some implementations, the watching behavior information may include at least one of the following items: video identifier, user identifier, user image information, identifier on whether the video is switched on, total video watching duration, or video playing time when switching off the video. The video identifier is used for uniquely indicating the video corresponding to the commentary generated based on the current value of the at least one parameter. The user identifier is used for uniquely indicating the user watching the video corresponding to the commentary generated based on the current value of the at least one parameter. The user image information is used for describing various user-related information. For example, the user image information may include, but is not limited to, user's gender, age of the user, hobbies of the user, birthplace of the user, work place of the user, living place of the user, occupation of the user, consumption habits of the user, living habits of the user. The identifier on whether the video is switched on is used for indicating whether the user indicated by the user identifier switches on the video indicated by the video identifier. The total video watching duration is used for indicating a total duration of the user indicated by the user identifier watching the video indicated by the video identifier. The video playing time when switching off the video is used for indicating a current playing time of the video when the user indicated by the user identifier switches off the video indicated by the video identifier.

Then, for each piece of the acquired watching behavior information, a video evaluation score corresponding to the watching behavior information is determined.

Here, for each piece of the acquired watching behavior information, the video evaluation score corresponding to the piece of watching behavior information may be determined by various implementations.

In some implementations, a corresponding weight may be preset for each item related to video evaluation included in the watching behavior information, then a weighted summation result of a value of each item related to video evaluation in the watching behavior information and the corresponding weight maybe computed, and the weighted summation result may be determined for use as the video evaluation score corresponding to the watching behavior information. For example, when the identifier on whether the video is switched on being 0 indicates that the user does not switch on the video, while when the identifier on whether the video is switched on being 1 indicates that the user switches on the video, then a weight corresponding to the identifier on whether the video is switched on may be provided such that the identifier on whether the video is switched on is positively correlated with the video evaluation score. For another example, a weight corresponding to the total video watching duration may be provided such that the total video watching duration is positively correlated with the video evaluation score, and a weight corresponding to the video playing time when switching off the video may be provided such that the video playing time when switching off the video is positively correlated with the video evaluation score. For still another example, when the watching behavior information may include an identifier on whether forwarding the video, an identifier on whether giving a thumb-up, and the like for indicating the user likes the video and then makes a corresponding operation of liking the video, similar to the identifier on whether the video is switched on, when the identifier on whether forwarding the video being 0 indicates that the user does not forward the video, while when the identifier on whether forwarding the video being 1 indicates that the user forwards the video, a weight corresponding to the identifier on whether forwarding the video may be provided such that the identifier on whether forwarding the video is positively correlated with the video evaluation score. The same operation may be further applied to the identifier on whether giving a thumb-up. The description will not be repeated here.

In some implementations, a ratio of the total video watching duration to the total duration of the video indicated by the video identifier may be further determined for use as the video evaluation score corresponding to the watching behavior information.

Finally, the average value of the determined each video evaluation score may be determined for use as the video evaluation score of the video corresponding to the commentary generated based on the current value of the at least one parameter.

Step 412: performing feature extraction on the current value of the at least one parameter, to obtain feature representation.

Here, the executing body may perform feature extraction on the current value of the at least one parameter, to obtain the feature representation. Here, the feature representation may be in various forms. For example, the feature representation may be in a vector form, i.e., an eigenvector. In practice, the feature representation presents characteristics of lower dimension and computability relative to the current value of the at least one parameter.

It will be appreciated that different parameters are involved in the process from determining the commentary of the target news cluster to generating the video corresponding to the commentary of the target news cluster. Accordingly, the method of performing feature extraction on the current value of the at least one parameter may also be different. For example, feature extraction may be performed by principal component analysis (PCA), independent component analysis (ICA), linear discriminant analysis (LDA), or the like.

Step 413: inputting the feature representation and the determined video evaluation score into a pre-trained evaluation network to obtain a predicted video evaluation score.

Here, the evaluation network may be an artificial neural network (ANN). It should be noted that the evaluation network is used for characterizing a corresponding relationship between the feature representation, the video evaluation score, and the predicted video evaluation score.

Step 414: inputting the feature representation and the predicted video evaluation score into a pre-trained action network to obtain current action information.

Here, the action network may also be the artificial neural network. It should be noted that the action network is used for characterizing the corresponding relationship between the feature representation, the video evaluation score, and action information. Here, the action information is used for indicating how to adjust the current value of the at least one parameter in the process from determining the commentary of the target news cluster to generating the video corresponding to the commentary of the target news cluster.

Figure 5:
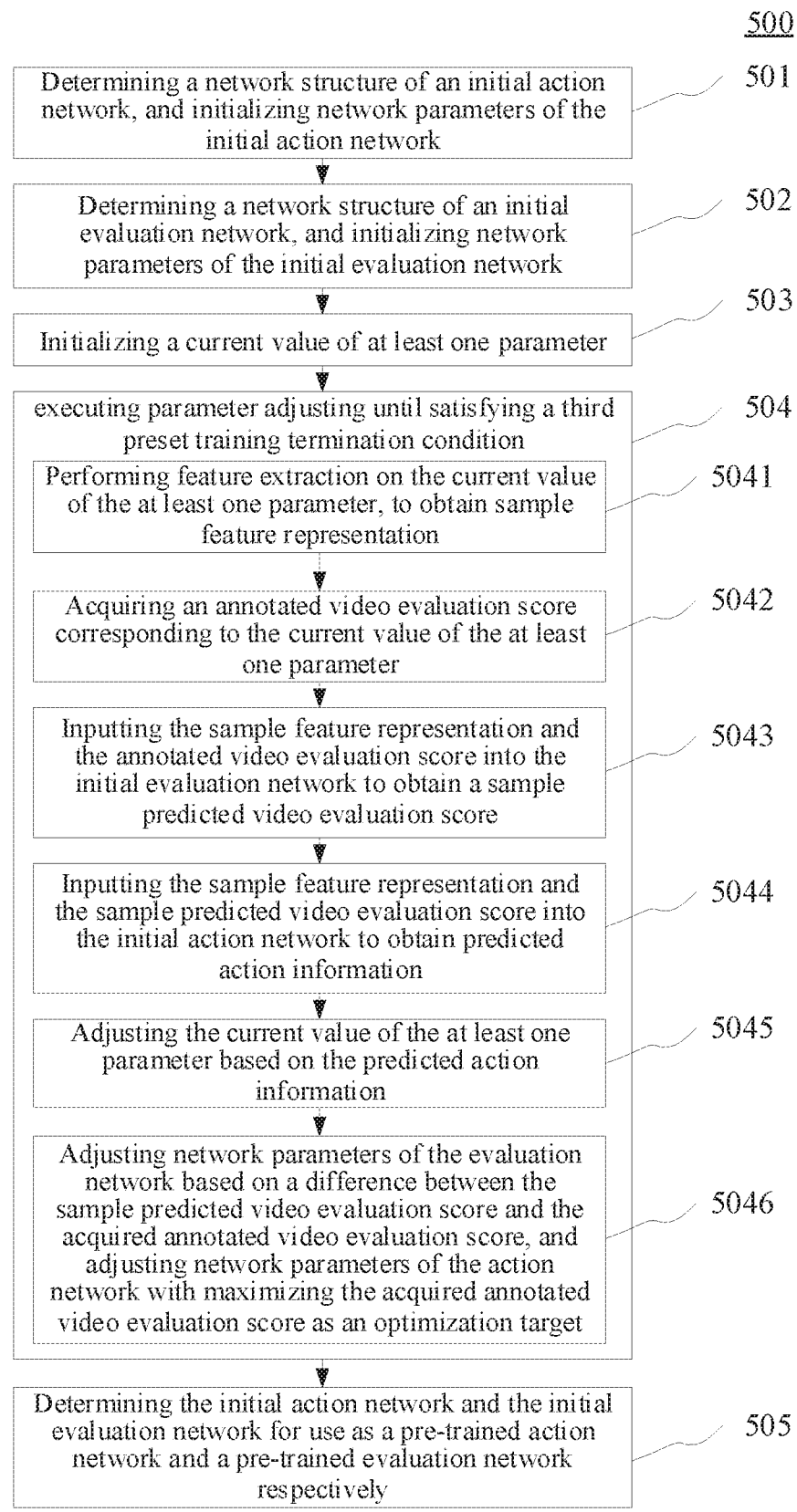
FIG. 5 is a resolved flowchart of intensive learning network training according to an embodiment of the present disclosure.

In some implementations, the above action network and evaluation network may be obtained by pre-training through intensive learning network training. Referring to FIG. 5, FIG. 5 shows a process 500 of intensive learning network training of pre-training an action network and an evaluation network according to an embodiment of the present disclosure. The intensive learning network training may include step 501 to step 505.

Step 501: determining a network structure of an initial action network, and initializing network parameters of the initial action network.

Here, an executing body of the intensive learning network training may be identical to or different from the executing body of the method for generating a video. If the executing body of the intensive learning network training is identical to the executing body of the method for generating a video, then the executing body of the intensive learning network training may store, after obtaining the action network and the evaluation network by training, network structure information and parameter values of the network parameters of the trained action network and the trained evaluation network locally. If the executing body of the intensive learning network training is different from the executing body of the method for generating a video, then the executing body of the intensive learning network training may send, after obtaining the action network and the evaluation network by training, network structure information and parameter values of the network parameters of the trained action network and the trained evaluation network to the executing body of the method for generating a video.

Here, the executing body of the intensive learning network training may first determine the network structure of the initial action network. Here, the initial action network may be an artificial neural network. Here, which layers are included in the initial action network, a sequential connection relationship between the layers, which neurons are included in each layer, weight and bias corresponding to each neuron, activation function of each layer, and the like maybe determined. It will be appreciated that the initial action network may include various types of neural networks. For different types of neural networks, to-be-determined network structures are also different.

Then, the executing body of the intensive learning network training may initialize the network parameters of the initial action network. In practice, each network parameter (e.g., weight and bias) of the initial action network may be initialized with some different small random numbers. The "small random number" is used to ensure that the network will not enter a saturation state due to very high weight, which will result in training failure. The "different" is used to ensure normal network learning.

Step 502: determining a network structure of an initial evaluation network, and initializing network parameters of the initial evaluation network.

Here, the executing body of the intensive learning network training may first determine the network structure of the initial evaluation network. Then, the executing body of the intensive learning network training may initialize the network parameters of the initial evaluation network.

Here, the initial evaluation network may also be the artificial neural network. Related description in step 501 may be referred to for how to determine a network structure of the artificial neural network and initialize network parameters of the artificial neural network. The description will not be repeated here.

Step 503: initializing a current value of at least one parameter.

Here, the executing body of the intensive learning network training may initialize the current value of the at least one parameter in a process from determining the commentary of the target news cluster to generating the video corresponding to the commentary of the target news cluster.

Step 504: executing parameter adjusting until satisfying a third preset training termination condition.

Here, the executing body of the intensive learning network training may execute the parameter adjusting until satisfying the third preset training termination condition, and the parameter adjusting may include substep 5041 to substep 5046.

Substep 5041: performing feature extraction on the current value of the at least one parameter, to obtain sample feature representation.

Substep 5042: acquiring an annotated video evaluation score corresponding to the current value of the at least one parameter.

Here, the executing body of the intensive learning network training may acquire the annotated video evaluation score corresponding to the current value of the at least one parameter locally or remotely from other electronic devices connected to the executing body of the intensive learning network training via a network. Here, the annotated video evaluation score corresponding to the current value of the at least one parameter may be the video evaluation score of manually annotated watched video after watching the video corresponding to the commentary of the target news cluster generated based on the current value of the at least one parameter.

Substep 5043: inputting the sample feature representation and the annotated video evaluation score into the initial evaluation network to obtain a sample predicted video evaluation score.

Here, the sample feature representation obtained in substep 5041 and the annotated video evaluation score obtained in substep 5042 may be inputted into the initial evaluation network to obtain the sample predicted video evaluation score.

Substep 5044: inputting the sample feature representation and the sample predicted video evaluation score into the initial action network to obtain predicted action information.

Here, the sample feature representation obtained in substep 5041 and the sample predicted video evaluation score obtained in substep 5043 may be inputted into the initial action network to obtain the predicted action information.

Substep 5045: adjusting the current value of the at least one parameter based on the predicted action information.

Here, the action information is used for indicating how to adjust the current value of the at least one parameter in the process from determining the commentary of the target news cluster to generating the video corresponding to the commentary of the target news cluster. Then, here, the current value of the at least one parameter may be adjusted based on the predicted action information obtained in substep 5044.

Substep 5046: adjusting network parameters of the evaluation network based on a difference between the sample predicted video evaluation score and the acquired annotated video evaluation score, and adjusting network parameters of the action network with maximizing the acquired annotated video evaluation score as an optimization target.

Here, the network parameters of the evaluation network may be adjusted based on the difference between the sample predicted video evaluation score and the acquired annotated video evaluation score by various implementations, and the network parameters of the action network may be adjusted with maximizing the acquired annotated video evaluation score as the optimization target.

For example, stochastic gradient descent, Newton's method, quasi-Newton method, conjugate gradient, heuristic optimization, and various other optimization algorithms that are known at present or are to be developed in the future may be employed.

For example, the third preset training termination condition may include at least one of the following: a training duration exceeds a sixth preset duration, the number of times of training exceeding a third preset number of times, or the difference between the sample predicted video evaluation score and the acquired annotated video evaluation score is less than a third preset difference threshold.

Step 505: determining the initial action network and the initial evaluation network for use as a pre-trained action network and a pre-trained evaluation network respectively.

The action network and the evaluation network may be obtained by training through the above step 501 to step 505.

After step 414, current action information is obtained.

Step 415: adjusting the current value of the at least one parameter based on the current action information.

The action information is used for indicating how to adjust the current value of the at least one parameter in the process from determining the commentary of the target news cluster to generating the video corresponding to the commentary of the target news cluster. Then, the current action information obtained in step 414 also includes how to adjust information of the current value of the at least one parameter in the process from determining the commentary of the target news cluster to generating the video corresponding to the commentary of the target news cluster, and then the executing body may adjust the current value of the at least one parameter based on the current action information by various implementations. For example, the current action information may indicate how much numerical value is a current value of a parameter increased by, how much numerical value is a current value of a parameter decreased by, a current value being multiplied by a coefficient, or how much is a parameter directly set to, or the like.

After completing executing step 415, the executing body may continue to execute step 401, and re-execute the process from determining the commentary of the target news cluster to generating the video corresponding to the commentary of the target news cluster based on parameter values of the at least one adjusted parameter. Because the parameter value of the at least one parameter have been adjusted in step 415, the adjusted parameter is more optimized than the parameter before adjustment, but the optimization target of the action network and the evaluation network may be guided, and the video evaluation score of the video corresponding to the commentary of the target news cluster generated based on the adjusted parameter will be higher than the video evaluation score of the video corresponding to the commentary of the target news cluster generated based on the parameter before adjustment.

As can be seen from FIG. 4A, compared with the corresponding embodiment of FIG. 2A, the process 400 of the method for generating a video in the present embodiment additionally provides the steps of determining a target news cluster, the monochromatic material resource detection, the alignment detection, and the sending the video corresponding to the commentary to a terminal device. Accordingly, the scheme described in the present embodiment may present a received video corresponding to the target news cluster on the terminal device. A user may quickly know about a news event to which the target news cluster is specific by watching the presented video corresponding to the commentary of the target news cluster on the terminal device, without the need for knowing about the news event to which the target news cluster is specific by the user by reading texts, thereby improving the user's efficiency in acquiring the news event by the terminal device, i.e., expanding the information presenting function of the terminal device.

Figure 6:
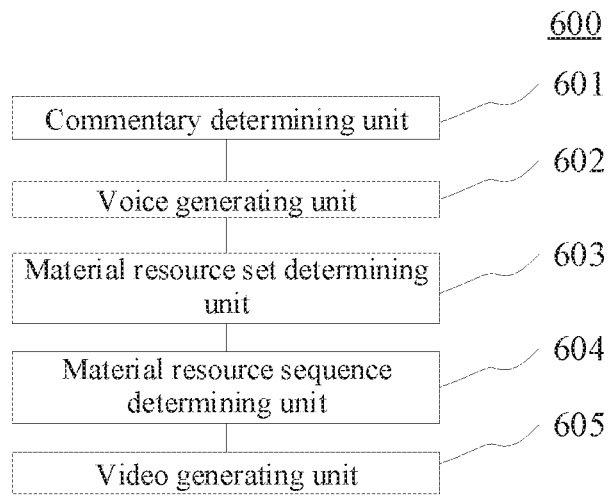
FIG. 6 is a schematic structural diagram of an apparatus for generating a video according to an embodiment of the present disclosure.

Further referring to FIG. 6, as an implementation of the method shown in the above figures, an embodiment of the present disclosure provides an apparatus for generating a video. The embodiment of the apparatus corresponds to the embodiment of the method shown in FIG. 2A. The apparatus may be specifically applied to various electronic devices.

As shown in FIG. 6, the apparatus 600 for generating a video of the present embodiment includes: a commentary determining unit 601, a voice generating unit 602, a material resource set determining unit 603, a material resource sequence determining unit 604, and a video generating unit 605. The commentary determining unit 601 is configured to determine a commentary of a target news cluster, each piece of news in the target news cluster being specific to a given news event; the voice generating unit 602 is configured to generate a voice corresponding to each paragraph in the commentary using a speech synthesis technology; the material resource set determining unit 603 is configured to determine a candidate material resource set corresponding to the commentary based on a video and an image included in the target news cluster, the candidate material resource being a video or image; the material resource sequence determining unit 604 is configured to determine a candidate material resource sequence corresponding to each paragraph in the commentary;

and the video generating unit 605 is configured to generate a video corresponding to the commentary based on the voice corresponding to each paragraph in the commentary and the candidate material resource sequence.

The related description of step 201, step 202, step 203, step 204, and step 205 in the corresponding embodiment of FIG. 2A may be referred to for specific processing of the commentary determining unit 601, the voice generating unit 602, the material resource set determining unit 603, the material resource sequence determining unit 604, and the video generating unit 605 of the apparatus 600 for generating a video and the technical effects thereof in the present embodiment, respectively. The description will not be repeated here.

In some alternative implementations of the present embodiment, the apparatus 600 may further include: a target news cluster determining unit (not shown in the figure) configured to determine, before determining the commentary of the target news cluster, the target news cluster.

In some alternative implementations of the present embodiment, the target news cluster determining unit (not shown in the figure) may include: a news cluster acquiring module (not shown in the figure) configured to acquire at least one news cluster composed of news generated within a recent first preset duration; and a target news cluster determining module (not shown in the figure) configured to determine the target news cluster based on the at least one news cluster.

In some alternative implementations of the present embodiment, the target news cluster determining module (not shown in the figure) may be further configured to: determine each news cluster of the at least one news cluster for use as the target news cluster.

In some alternative implementations of the present embodiment, the target news cluster determining module (not shown in the figure) may also be further configured to: rank each news cluster of the at least one news cluster in descending order of the number of pieces of news generated within a recent second preset duration within the news cluster; and determine each news cluster ranked within a preset ranking range of the at least one news cluster for use as the target news cluster.

In some alternative implementations of the present embodiment, the target news cluster determining module (not shown in the figure) may further be configured to: determine each excellent news cluster of the at least one news cluster for use as the target news cluster, where the number of images included in news included in the excellent news cluster is greater than a preset minimum number of images and the number of videos included in the news included in the excellent news cluster is greater than a preset minimum number of videos.

In some alternative implementations of the present embodiment, the target news cluster determining module (not shown in the figure) may further be configured to: determine, for each news cluster of the at least one news cluster, a news event theme corresponding to the news cluster and a current occurrence frequency of the determined news event theme based on each piece of news in the news cluster; determine a frequency difference of the current occurrence frequency of the news event theme corresponding to each news cluster of the at least one news cluster minus a historical occurrence frequency of the news event theme; and determine a news cluster, with the frequency difference of the news event theme greater than a preset frequency difference threshold, in the at least one news cluster for use as the target news cluster.

In some alternative implementations of the present embodiment, the commentary determining unit 601 may include: a score determining module (not shown in the figure) configured to determine, for each piece of news in the target news cluster, a score of the piece of news suitable for generating a commentary; a target news determining module (not shown in the figure) configured to determine a piece of news with a highest score suitable for generating a commentary in the target news cluster for use as target news; and a commentary generating module (not shown in the figure) configured to generate the commentary of the target news cluster based on the target news.

In some alternative implementations of the present embodiment, the commentary generating module (not shown in the figure) may be further configured to: determine a text included in the target news for use as a target text; delete a text, unsuitable for commentary, included in the target text, where the text unsuitable for commentary is a text in a predetermined text set unsuitable for commentary; replace a written word included in the target text with a spoken word with a same semantic meaning; and determine a digest text obtained by extracting a digest from the target text for use as the commentary of the target news cluster.

In some alternative implementations of this embodiment, the determining a digest text obtained by extracting a digest from the target text for use as the commentary of the target news cluster may include: determining a maximum number of words of the commentary based on a preset fastest speech rate and a preset longest audio duration; extracting the digest from the target text, and a number of words of the extracted digest text being less than the maximum number of words of the commentary; and determining the extracted digest text for use as the commentary of the target news cluster.

In some alternative implementations of the present embodiment, the score determining module (not shown in the figure) may be further configured to: extract an eigenvalue of the news based on at least one feature; and determine a score of the news suitable for generating the commentary based on the extracted at least one eigenvalue.

In some alternative implementations of the present embodiment, the score determining module (not shown in the figure) may further be configured to: input a text included in the news into a pre-trained score computing model, to obtain the score of the news suitable for generating the commentary, where the score computing model is used for characterizing a corresponding relationship between the text and a score of the text suitable for generating the commentary.

In some alternative implementations of the present embodiment, the material resource sequence determining unit 603 may further be configured to: determine the video and the image included in the target news cluster for use as the candidate material resource set corresponding to the commentary.

In some alternative implementations of the present embodiment, the material resource set determining unit 603 may include: a target video set determining module (not shown in the figure) configured to determine at least one video clip obtained by performing semantic segmentation on each video included in the target news cluster for use as a target video set; a target image set determining module (not shown in the figure) configured to determine respective images included in the target news cluster for use as a target image set; and a material resource set determining module (not shown in the figure) configured to determine the candidate material resource set corresponding to the commentary based on the target video set and the target image set, the candidate material resource being the video or image.

In some alternative implementations of the present embodiment, the material resource set determining module (not shown in the figure) may further be configured to: merge the target video set and the target image set to obtain the candidate material resource set corresponding to the commentary.

In some alternative implementations of the present embodiment, the material resource set determining module (not shown in the figure) may further be configured to: input, for each target video in the target video set, the target video into a pre-trained vivid video detection model, to obtain a vivid video detection result corresponding to the target video, where the vivid video detection model is used for characterizing a corresponding relationship between a video and a vivid video detection result for characterizing whether the video is a vivid video; delete a target video with a corresponding vivid video detection result for characterizing a non-vivid video in the target video set; and merge the target video set and the target image set to obtain the candidate material resource set corresponding to the commentary.

In some alternative implementations of the present embodiment, the material resource set determining module (not shown in the figure) may further be configured to: delete, after deleting a target video with a corresponding vivid video detection result for characterizing a non-vivid video in the target video set, a video with a video playing duration less than a preset shortest candidate video duration in the target video set.

In some alternative implementations of the present embodiment, a playing duration of an image in a video corresponding to the commentary may be a preset image playing duration; and the material resource sequence determining unit 604 may include: a matching degree determining module (not shown in the figure) configured to determine, for each paragraph in the commentary, a matching degree between the paragraph and each candidate material resource in the candidate material resource set; and a material resource sequence determining module (not shown in the figure) configured to determine a candidate material resource sequence corresponding to each paragraph in the commentary based on the matching degree between each paragraph in the commentary and the each candidate material resource, a playing duration of the each candidate material resource and a text length of each paragraph in the commentary.

In some alternative implementations of the present embodiment, the matching degree determining module (not shown in the figure) may further be configured to: determine, for each paragraph in the commentary, a semantic vector corresponding to the paragraph; determine, for each candidate material resource in the candidate material resource set, a semantic vector corresponding to the candidate material resource; and determine a similarity between the semantic vector corresponding to each paragraph in the commentary and the semantic vector corresponding to each candidate material resource in the candidate material resource set, for use as the matching degree between the corresponding paragraph and the corresponding candidate material resource.

In some alternative implementations of the present embodiment, the determining a similarity between the semantic vector corresponding to each paragraph in the commentary and the semantic vector corresponding to each candidate material resource in the candidate material resource set, for use as the matching degree between the corresponding paragraph and the corresponding candidate material resource includes: performing, in response to determining the candidate material resource being an image, semantic segmentation on the image candidate material resource, to obtain at least one semantic annotation result corresponding to the image candidate material resource, and determining a semantic vector corresponding to the candidate material resource based on a semantic vector corresponding to each semantic annotation result of the obtained at least one semantic annotation result;

down sampling, in response to determining the candidate material resource being a video, the video candidate material resource, to obtain at least one sample image; performing, for each sample image of the at least one sample image, semantic segmentation on the sample image, to obtain at least one semantic annotation result corresponding to the sample image, and determining a semantic vector corresponding to the sample image based on the semantic vector corresponding to each semantic annotation result of the obtained at least one semantic annotation result; and determining the semantic vector corresponding to the candidate material resource based on the semantic vector corresponding to the each sample image.

In some alternative implementations of the present embodiment, the material resource sequence determining module (not shown in the figure) may further be configured to: determine, for each paragraph in the commentary, the candidate material resource sequence corresponding to the paragraph using a first preset optimization algorithm, with a playing duration of the candidate material resource sequence corresponding to the paragraph being equal to a playing duration corresponding to the paragraph as a constraint condition, with maximizing a matching degree between the candidate material resource sequence corresponding to the paragraph and the paragraph as an optimization target.

In some alternative implementations of the present embodiment, the material resource sequence determining module (not shown in the figure) may further be configured to: determine the candidate material resource sequence corresponding to each paragraph in the commentary using a second preset optimization algorithm, with the playing duration of the candidate material resource sequence corresponding to each paragraph in the commentary being equal to the playing duration corresponding to the paragraph as a constraint condition, with maximizing a sum of a matching degree between the candidate material resource sequence corresponding to each paragraph in the commentary and the corresponding paragraph as an optimization target.

In some alternative implementations of the present embodiment, candidate material resources in the candidate material resource sequence corresponding to each paragraph in the commentary are mutually different.

In some alternative implementations of the present embodiment, the video generating unit 605 may be further configured to: connect the voice corresponding to each paragraph in sequence from front to rear of each paragraph in the commentary, to obtain a first audio; connect a video corresponding to each paragraph in sequence from front to rear of each paragraph in the commentary, to obtain a first video, where the video corresponding to the paragraph is a video obtained by sequentially connecting the candidate material resources in the candidate material resource sequence corresponding to the paragraph; and determine the obtained first audio and first video for use as an audio part and a video part in the video corresponding to the commentary respectively.

In some alternative implementations of the present embodiment, the video generating unit 605 may be further configured to: input, for each paragraph in the commentary, the paragraph into a pre-trained video pre-playing time determining model, to obtain a video pre-playing duration corresponding to the paragraph, where the video pre-playing duration determining model is used for characterizing a corresponding relationship between a text and a video pre-playing duration corresponding to the text; execute following paragraph video clipping, for each paragraph except for a last paragraph in the commentary, in sequence from front to rear of the paragraph in the commentary: determining a video pre-playing duration corresponding to a paragraph following the paragraph for use as a video clipping duration; sequentially connecting each candidate material resource in the candidate material resource sequence corresponding to the paragraph, to obtain a video corresponding to the paragraph; and clipping a video of the video clipping duration at a tail of the video corresponding to the paragraph; sequentially connect each candidate material resource in the candidate material resource sequence corresponding to the last paragraph in the commentary, to obtain a video corresponding to the last paragraph; connect a video corresponding to each paragraph in sequence from front to rear of the paragraph in the commentary, to obtain a second video; connect the voice corresponding to each paragraph in sequence from front to rear of each paragraph in the commentary, to obtain a second audio; and determine the obtained second audio and second video for use as an audio part and a video part in the video corresponding to the commentary respectively.

In some alternative implementations of the present embodiment, the video generating unit 605 may be further configured to: input, for each paragraph in the commentary, the paragraph into a pre-trained video pre-playing time determining model, to obtain a video pre-playing duration corresponding to the paragraph, where the video pre-playing duration determining model is used for characterizing a corresponding relationship between a text and a video pre-playing duration corresponding to the text; execute following paragraph audio extending, for each paragraph except for the last paragraph in the commentary, in sequence from front to rear of the paragraph in the commentary: determining the video pre-playing duration corresponding to a paragraph following the paragraph for use as an audio extending duration; and adding a mute playing duration of the determined audio extending duration to a tail of the voice corresponding to the paragraph; connect the voice corresponding to each paragraph in sequence from front to rear of each paragraph in the commentary, to obtain a third audio; connect a video corresponding to each paragraph in sequence from front to rear of each paragraph in the commentary, to obtain a third video, where the video corresponding to each paragraph is a video obtained by sequentially connecting the candidate material resources in the candidate material resource sequence corresponding to the paragraph; and determine the obtained third audio and third video for use as an audio part and a video part in the video corresponding to the commentary respectively.

In some alternative implementations of the present embodiment, the apparatus 600 may further include: a monochromatic material resource detecting unit (not shown in the figure) configured to: before generating the video corresponding to the commentary based on the voice corresponding to each paragraph in the commentary and the candidate material resource sequence, execute following monochromatic material resource detection, for each paragraph in the commentary: deleting, for each material resource in the candidate material resource sequence corresponding to the paragraph, in response to determining that the material resource is a video and a monochromatic image frame is present in the video material resource, the monochromatic image frame in the material resource; and deleting, in response to determining that the material resource is an image and the image material resource is a monochromatic image, the material resource from the candidate material resource sequence corresponding to the paragraph.

In some alternative implementations of the present embodiment, the apparatus 600 may further include: an alignment detecting unit (not shown in the figure) configured to: before generating the video corresponding to the commentary based on the voice corresponding to each paragraph in the commentary and the candidate material resource sequence, execute following alignment detection, for each paragraph in the commentary: extending, in response to determining a playing duration of the voice corresponding to the paragraph being greater than the playing duration of the candidate material resource sequence corresponding to the paragraph, a playing duration of an image type candidate material resource in the candidate material resource sequence corresponding to the paragraph, or selecting a candidate material resource from the candidate material resource set, and adding the selected candidate material resource to the candidate material resource sequence corresponding the paragraph, such that the playing duration of the voice corresponding to the paragraph is equal to the playing duration of the candidate material resource sequence corresponding to the paragraph.

In some alternative implementations of the present embodiment, the apparatus 600 may further include: a video sending unit (not shown in the figure) configured to: after generating the video corresponding to the commentary based on the voice corresponding to each paragraph in the commentary and the candidate material resource sequence, send the video corresponding to the commentary to a terminal device.

In some alternative implementations of the present embodiment, the apparatus 600 may further include: a current parameter value acquiring unit (not shown in the figure) configured to acquire a current value of at least one parameter in a process from determining the commentary of the target news cluster to generating the video corresponding to the commentary; a video evaluation score determining unit (not shown in the figure) configured to determine a video evaluation score of the video corresponding to the commentary; a feature extracting unit (not shown in the figure) configured to perform feature extraction on the current value of the at least one parameter, to obtain feature representation; a first inputting unit (not shown in the figure) configured to input the feature representation and the determined video evaluation score into a pre-trained evaluation network to obtain a predicted video evaluation score; a second inputting unit (not shown in the figure) configured to input the feature representation and the predicted video evaluation score into a pre-trained action network to obtain current action information; and a parameter adjusting unit (not shown in the figure) configured to adjust the current value of the at least one parameter based on the current action information.

In some alternative implementations of the present embodiment, the apparatus 600 may further include: a video re-generating unit (not shown in the figure) configured to re-execute the process from determining the commentary of the target news cluster to generating the video corresponding to the commentary based on the current value of the at least one parameter.

It should be noted that the description of other embodiments in the present disclosure may be referred to for implementation details and technical effects of the units in the apparatus for generating a video according to some embodiments of the present disclosure. The description will not be repeated here.

Figure 7:
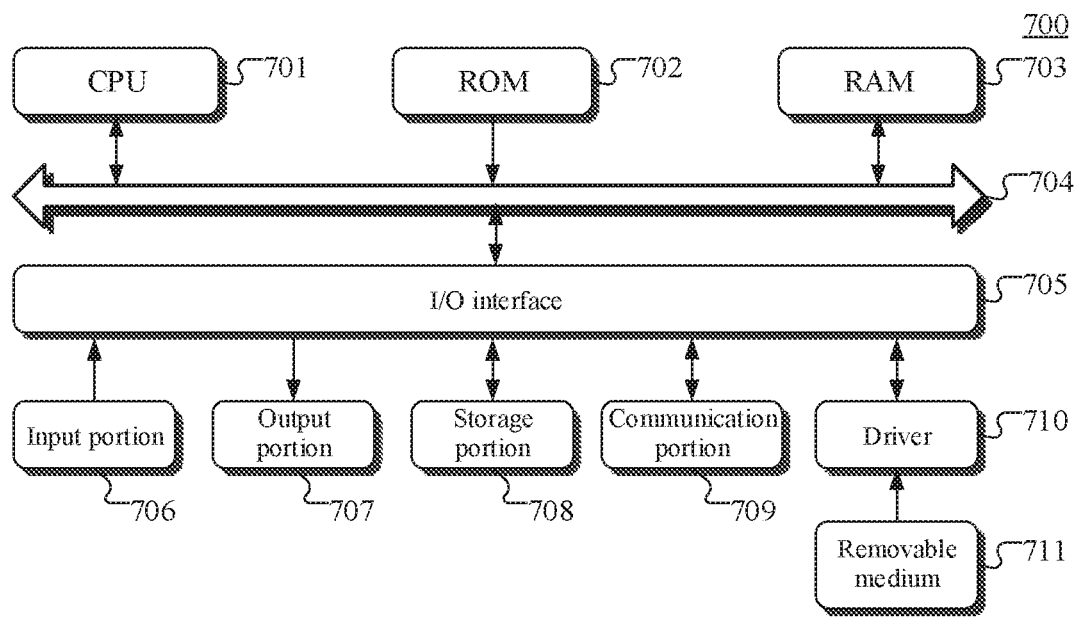
FIG. 7 is a schematic structural diagram of a computer system adapted to implement a server of some embodiments of the present disclosure.

Referring to FIG. 7, a schematic structural diagram of a computer system 700 of a server adapted to implement some embodiments of the present disclosure is shown. The server shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the CPU 701, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that maybe implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved.

It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by software or hardware. The described units may also be provided in a processor, for example, described as: a processor including a commentary determining unit, a voice generating unit, a material resource set determining unit, a material resource sequence determining unit, and a video generating unit. The names of the units do not constitute a limitation to such units themselves in some cases. For example, the commentary determining unit may be further described as "a unit configured to determine a commentary of a target news cluster."

In another aspect, the present disclosure further provides a computer readable medium. The computer readable medium may be included in the apparatus described in the above embodiments, or a stand-alone computer readable medium without being assembled into the apparatus. The computer readable medium carries one or more programs. The one or more programs, when executed by the apparatus, cause the apparatus to: determine a commentary of a target news cluster, each piece of news in the target news cluster being specific to a given news event; generate a voice corresponding to each paragraph in the commentary using a speech synthesis technology; determine a candidate material resource set corresponding to the commentary based on a video and an image included in the target news cluster, the candidate material resource being a video or image; determine a candidate material resource sequence corresponding to each paragraph in the commentary; and generate a video corresponding to the commentary based on the voice corresponding to each paragraph in the commentary and the candidate material resource sequence.

In another aspect, an embodiment of the present disclosure provides another server, including an interface, a storage storing one or more programs, and one or more processors operatively connected to the interface and the storage and configured to: determine a commentary of a target news cluster, each piece of news in the target news cluster being specific to a given news event; generate a voice corresponding to each paragraph in the commentary using a speech synthesis technology; determine a candidate material resource set corresponding to the commentary based on a video and an image included in the target news cluster, the candidate material resource being a video or image; determine a candidate material resource sequence corresponding to the each paragraph in the commentary; and generate a video corresponding to the commentary based on the voice corresponding to the each paragraph in the commentary and the candidate material resource sequence.

In another aspect, an embodiment of the present disclosure provides a computer readable storage medium, storing a computer program thereon, where the computer program, when executed by one or more processors, causes the one or more processors to: determine a commentary of a target news cluster, each piece of news in the target news cluster being specific to a given news event; generate a voice corresponding to each paragraph in the commentary using a speech synthesis technology; determine a candidate material resource set corresponding to the commentary based on a video and an image included in the target news cluster, the candidate material resource being a video or image; determine a candidate material resource sequence corresponding to the each paragraph in the commentary; and generate a video corresponding to the commentary based on the voice corresponding to the each paragraph in the commentary and the candidate material resource sequence.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a video, comprising:
   determining a commentary of a target news cluster, each piece of news in the target news cluster being specific to a given news event;
   generating a voice corresponding to each paragraph in the commentary using a speech synthesis technology;
   determining a candidate material resource set corresponding to the commentary based on a video and an image included in the target news cluster, the candidate material resource being a video or image;
   determining a candidate material resource sequence corresponding to the each paragraph in the commentary; and
   generating a video corresponding to the commentary based on the voice corresponding to the each paragraph in the commentary and the candidate material resource sequence.

2. The method according to claim 1, wherein before determining the commentary of the target news cluster, the method further comprises:
   acquiring at least one news cluster composed of news generated within a recent first preset duration; and
   determining the target news cluster based on the at least one news cluster.

3. The method according to claim 2, wherein the determining the target news cluster based on the at least one news cluster comprises:
   determining each news cluster of the at least one news cluster for use as the target news cluster;
   or
   ranking each news cluster of the at least one news cluster in descending order of a number of pieces of news generated within a recent second preset duration within the each news cluster; and determining each news cluster ranked within a preset ranking range of the at least one news cluster for use as the target news cluster;
   or
   determining each excellent news cluster of the at least one news cluster for use as the target news cluster, wherein a number of images included in news included in the each excellent news cluster is greater than a preset minimum number of images, and a number of videos included in the news included in the each excellent news cluster is greater than a preset minimum number of videos;
   or
   determining, for each news cluster of the at least one news cluster, a news event theme corresponding to the news cluster and a current occurrence frequency of the determined news event theme based on each piece of news in the news cluster; determining a frequency difference of the current occurrence frequency of the news event theme corresponding to the each news cluster of the at least one news cluster minus a historical occurrence frequency of the news event theme; and determining a news cluster, with the frequency difference of the news event theme greater than a preset frequency difference threshold, in the at least one news cluster for use as the target news cluster.

4. The method according to claim 1, wherein the determining a commentary of a target news cluster comprises:
determining, for each piece of news in the target news cluster, a score of the piece of news suitable for generating a commentary;
determining a piece of news with a highest score suitable for generating a commentary in the target news cluster for use as target news; and
generating the commentary of the target news cluster based on the target news.

5. The method according to claim 4, wherein the generating the commentary of the target news cluster based on the target news comprises:
determining a text included in the target news for use as a target text;
deleting a text, unsuitable for commentary, included in the target text, wherein the text unsuitable for commentary is a text in a predetermined text set unsuitable for commentary;
replacing a written word included in the target text with a spoken word with a same semantic meaning; and
determining a digest text obtained by extracting a digest of the target text for use as the commentary of the target news cluster.

6. The method according to claim 5, wherein the determining a digest text obtained by extracting a digest of the target text for use as the commentary of the target news cluster comprises:
determining a maximum number of words of the commentary based on a preset fastest speech rate and a preset longest audio duration;
extracting the digest of the target text, a number of words of the extracted digest text being less than the maximum number of words of the commentary; and
determining the extracted digest text for use as the commentary of the target news cluster.

7. The method according to claim 4, wherein the determining, for each piece of news in the target news cluster, a score of the each piece of news suitable for generating a commentary comprises:
extracting an eigenvalue of the each piece of news based on at least one feature; and determining a score of the each piece of news suitable for generating the commentary based on the extracted at least one eigenvalue; or
inputting a text included in the each piece of news into a pre-trained score computing model, to obtain the score of the each piece of news suitable for generating the commentary, wherein the score computing model is used for characterizing a corresponding relationship between the text and a score of the text suitable for generating the commentary.

8. The method according to claim 1, wherein the determining a candidate material resource set corresponding to the commentary based on a video and an image included in the target news cluster comprises:

determining the video and the image included in the target news cluster for use as the candidate material resource set corresponding to the commentary;
or
determining at least one video clip obtained by performing semantic segmentation on each video included in the target news cluster for use as a target video set; determining respective images included in the target news cluster for use as a target image set; and determining the candidate material resource set corresponding to the commentary based on the target video set and the target image set, the candidate material resource being the video or image.

9. The method according to claim 8, wherein the determining the candidate material resource set corresponding to the commentary based on the target video set and the target image set comprises:
merging the target video set and the target image set to obtain the candidate material resource set corresponding to the commentary.

10. The method according to claim 8, wherein the determining the candidate material resource set corresponding to the commentary based on the target video set and the target image set comprises:
inputting, for each target video in the target video set, the target video into a pre-trained vivid video detection model, to obtain a vivid video detection result corresponding to the target video, wherein the vivid video detection model is used for characterizing a corresponding relationship between a video and a vivid video detection result for characterizing whether the video is a vivid video;
deleting a target video with a corresponding vivid video detection result for characterizing a non-vivid video in the target video set; and
merging the target video set and the target image set to obtain the candidate material resource set corresponding to the commentary.

11. The method according to claim 10, wherein after the deleting a target video with a corresponding vivid video detection result for characterizing a non-vivid video in the target video set, the method further comprises:
deleting a video with a video playing duration less than a preset shortest candidate video duration in the target video set.

12. The method according to claim 1, wherein a playing duration of an image in a video corresponding to the commentary is a preset image playing duration; and
the determining a candidate material resource sequence corresponding to the each paragraph in the commentary comprises:
determining, for the each paragraph in the commentary, a matching degree between the paragraph and each candidate material resource in the candidate material resource set; and
determining a candidate material resource sequence corresponding to the each paragraph in the commentary based on the matching degree between the each paragraph in the commentary and the each candidate material resource, a playing duration of the each candidate material resource and a text length of the each paragraph in the commentary.

13. The method according to claim 12, wherein the determining, for the each paragraph in the commentary, a matching degree between the paragraph and each candidate material resource in the candidate material resource set comprises:

determining, for the each paragraph in the commentary, a semantic vector corresponding to the paragraph;

determining, for the each candidate material resource in the candidate material resource set, a semantic vector corresponding to the candidate material resource; and determining a similarity between the semantic vector corresponding to the each paragraph in the commentary and the semantic vector corresponding to the each candidate material resource in the candidate material resource set, for use as the matching degree between the corresponding each paragraph and the corresponding each candidate material resource.

14. The method according to claim 13, wherein the determining a similarity between the semantic vector corresponding to the each paragraph in the commentary and the semantic vector corresponding to the each candidate material resource in the candidate material resource set, for use as the matching degree between the corresponding each paragraph and the corresponding each candidate material resource comprises:

performing, in response to determining the candidate material resource being an image, semantic segmentation on the image candidate material resource, to obtain at least one semantic annotation result corresponding to the image candidate material resource, and determining a semantic vector corresponding to the candidate material resource based on a semantic vector corresponding to each semantic annotation result of the obtained at least one semantic annotation result;

down sampling, in response to determining the candidate material resource being a video, the video candidate material resource, to obtain at least one sample image;

performing, for each sample image of the at least one sample image, semantic segmentation on the sample image, to obtain at least one semantic annotation result corresponding to the each sample image, and determining a semantic vector corresponding to the sample image based on the semantic vector corresponding to the each semantic annotation result of the obtained at least one semantic annotation result; and determining the semantic vector corresponding to the candidate material resource based on the semantic vector corresponding to the each sample image.

15. The method according to claim 12, wherein the determining a candidate material resource sequence corresponding to the each paragraph in the commentary based on the matching degree between the each paragraph in the commentary and the each candidate material resource, a playing duration of the each candidate material resource and a text length of the each paragraph in the commentary comprises:

determining, for the each paragraph in the commentary, the candidate material resource sequence corresponding to the paragraph using a first preset optimization algorithm, with a playing duration of the candidate material resource sequence corresponding to the paragraph being equal to a playing duration corresponding to the paragraph as a constraint condition, with maximizing a matching degree between the candidate material resource sequence corresponding to the paragraph and the paragraph as an optimization target;

or determining the candidate material resource sequence corresponding to the each paragraph in the commentary using a second preset optimization algorithm, with the playing duration of the candidate material resource sequence corresponding to the each paragraph in the commentary being equal to the playing duration corresponding to the each paragraph as a constraint condition, with maximizing a sum of a matching degree between the candidate material resource sequence corresponding to the each paragraph in the commentary and the corresponding each paragraph as an optimization target.

16. The method according to claim 15, wherein candidate material resources in the candidate material resource sequence corresponding to the each paragraph in the commentary are mutually different.

17. The method according to claim 1, wherein the generating a video corresponding to the commentary based on the voice corresponding to the each paragraph in the commentary and the candidate material resource sequence comprises:

connecting the voice corresponding to the each paragraph in sequence from front to rear of the each paragraph in the commentary, to obtain a first audio;

connecting a video corresponding to the each paragraph in sequence from front to rear of the each paragraph in the commentary, to obtain a first video, wherein the video corresponding to the each paragraph is a video obtained by sequentially connecting the candidate material resources in the candidate material resource sequence corresponding to the each paragraph; and determining the obtained first audio and first video for use as an audio part and a video part in the video corresponding to the commentary respectively;

or inputting, for each paragraph in the commentary, the paragraph into a pre-trained video pre-playing time determining model, to obtain a video pre-playing duration corresponding to the paragraph, wherein the video pre-playing duration determining model is used for characterizing a corresponding relationship between a text and a video pre-playing duration corresponding to the text;

executing following paragraph video clipping, for each paragraph except for a last paragraph in the commentary, in sequence from front to rear of the paragraph in the commentary: determining a video pre-playing duration corresponding to a paragraph following the paragraph for use as a video clipping duration; sequentially connecting each candidate material resource in the candidate material resource sequence corresponding to the paragraph, to obtain a video corresponding to the paragraph; and clipping a video of the video clipping duration at a tail of the video corresponding to the paragraph;

sequentially connecting each candidate material resource in the candidate material resource sequence corresponding to the last paragraph in the commentary, to obtain a video corresponding to the last paragraph;

connecting a video corresponding to each paragraph in sequence from front to rear of the each paragraph in the commentary, to obtain a second video;

connecting the voice corresponding to each paragraph in sequence from front to rear of the each paragraph in the commentary, to obtain a second audio; and determining the obtained second audio and second video for use as an audio part and a video part in the video corresponding to the commentary respectively.

18. The method according to claim 1, wherein the generating a video corresponding to the commentary based on the voice corresponding to the each paragraph in the commentary and the candidate material resource sequence comprises:

inputting, for each paragraph in the commentary, the paragraph into a pre-trained video pre-playing time determining model, to obtain a video pre-playing duration corresponding to the paragraph, wherein the video pre-playing duration determining model is used for characterizing a corresponding relationship between a text and a video pre-playing duration corresponding to the text;

executing following paragraph audio extending, for each paragraph except for the last paragraph in the commentary, in sequence from front to rear of the paragraph in the commentary: determining the video pre-playing duration corresponding to a paragraph following the paragraph for use as an audio extending duration; and adding a mute playing duration of the determined audio extending duration to a tail of the voice corresponding to the paragraph;

connecting the voice corresponding to each paragraph in sequence from front to rear of the each paragraph in the commentary, to obtain a third audio;

connecting a video corresponding to each paragraph in sequence from front to rear of the each paragraph in the commentary, to obtain a third video, wherein the video corresponding to the each paragraph is a video obtained by sequentially connecting the candidate material resources in the candidate material resource sequence corresponding to the each paragraph; and determining the obtained third audio and third video for use as an audio part and a video part in the video corresponding to the commentary respectively.

19. The method according to claim 1, wherein before generating the video corresponding to the commentary based on the voice corresponding to the each paragraph in the commentary and the candidate material resource sequence, the method further comprises:

executing following monochromatic material resource detection, for the each paragraph in the commentary:

deleting, for each material resource in the candidate material resource sequence corresponding to the paragraph, in response to determining that the material resource is a video and a monochromatic image frame is present in the video material resource, the monochromatic image frame in the material resource; and deleting, in response to determining that the material resource is an image and the image material resource is a monochromatic image, the material resource from the candidate material resource sequence corresponding to the paragraph.

20. The method according to claim 19, wherein before generating the video corresponding to the commentary based on the voice corresponding to the each paragraph in the commentary and the candidate material resource sequence, the method further comprises:

executing following alignment detection, for the each paragraph in the commentary: extending, in response to determining a playing duration of the voice corresponding to the paragraph being greater than a playing duration of the candidate material resource sequence corresponding to the paragraph, a playing duration of an image type candidate material resource in the candidate material resource sequence corresponding to the paragraph, or selecting a candidate material resource from the candidate material resource set, and adding the selected candidate material resource to the candidate material resource sequence corresponding the paragraph, such that the playing duration of the voice corresponding to the paragraph is equal to the playing duration of the candidate material resource sequence corresponding to the paragraph.

21. The method according to claim 1, wherein after generating the video corresponding to the commentary based on the voice corresponding to the each paragraph in the commentary and the candidate material resource sequence, the method further comprises:

sending the video corresponding to the commentary to a terminal device.

22. The method according to claim 1, wherein the method further comprises:

acquiring a current value of at least one parameter in a process from determining the commentary of the target news cluster to generating the video corresponding to the commentary;

determining a video evaluation score of the video corresponding to the commentary;

performing feature extraction on the current value of the at least one parameter, to obtain feature representation;

inputting the feature representation and the determined video evaluation score into a pre-trained evaluation network to obtain a predicted video evaluation score;

inputting the feature representation and the predicted video evaluation score into a pre-trained action network to obtain current action information; and adjusting the current value of the at least one parameter based on the current action information.

23. The method according to claim 22, wherein the method further comprises:

re-executing the process from determining the commentary of the target news cluster to generating the video corresponding to the commentary based on the current value of the at least one parameter.

24. An apparatus for generating a video, comprising:

at least one processor; and a memory storing instructions, wherein the instructions when executed by the at least one processor, cause the at least one processor to perform operations, the operations comprising:

determining a commentary of a target news cluster, each piece of news in the target news cluster being specific to a given news event;

generating a voice corresponding to each paragraph in the commentary using a speech synthesis technology;

determining a candidate material resource set corresponding to the commentary based on a video and an image included in the target news cluster, the candidate material resource being a video or image;

determining a candidate material resource sequence corresponding to the each paragraph in the commentary; and generating a video corresponding to the commentary based on the voice corresponding to the each paragraph in the commentary and the candidate material resource sequence.

* * * * *

UNITED STATES PATENT AND TRADEMARK OFFICE
CERTIFICATE OF CORRECTION

PATENT NO. : 10,885,344 B2  
APPLICATION NO. : 16/703716  
DATED : January 5, 2021  
INVENTOR(S) : Hao Tian et al.

Page 1 of 1

It is certified that error appears in the above-identified patent and that said Letters Patent is hereby corrected as shown below:

On the Title Page

Item (72) Inventors:
"Darning Lu, Sunnyvale, CA (US)" should read: --Daming Lu, Sunnyvale, CA (US)--.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*